US011621849B2

(12) United States Patent
Rule et al.

(10) Patent No.: US 11,621,849 B2
(45) Date of Patent: *Apr. 4, 2023

(54) CALL CENTER WEB-BASED AUTHENTICATION USING A CONTACTLESS CARD

(71) Applicant: Capital One Services, LLC, McLean, VA (US)

(72) Inventors: Jeffrey Rule, Chevy Chase, MD (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/489,210

(22) Filed: Sep. 29, 2021

(65) Prior Publication Data

US 2022/0141024 A1 May 5, 2022

Related U.S. Application Data

(63) Continuation of application No. 17/085,768, filed on Oct. 30, 2020, now Pat. No. 11,165,586.

(51) Int. Cl.
*H04L 9/32* (2006.01)
*G06F 16/955* (2019.01)
(Continued)

(52) U.S. Cl.
CPC ........ *H04L 9/3234* (2013.01); *G06F 16/9566* (2019.01); *G06K 7/10297* (2013.01);
(Continued)

(58) Field of Classification Search
CPC ..... H04L 9/3234; H04L 9/0877; H04L 67/02; H04L 2209/805; H04L 63/0807;
(Continued)

(56) References Cited

U.S. PATENT DOCUMENTS 5,745,556 A * 4/1998 Ronen .................... H04L 12/14
379/119
6,353,852 B1 * 3/2002 Nestoriak, III ....... H04L 63/083
379/93.24

(Continued)

OTHER PUBLICATIONS

International Search Report and Written Opinion for International Patent Application No. PCT/US2021/053496 dated Jan. 14, 2022, 13 pages.

*Primary Examiner* — Dung B Huynh
(74) *Attorney, Agent, or Firm* — KDB Firm PLLC

(57) ABSTRACT

Systems, methods, articles of manufacture, and computer-readable media. A server may receive a phone call and generate a uniform resource locator (URL) comprising a session identifier for an account. The server may transmit the URL to a client device. The server may receive, from a web browser, a request comprising the URL. The server may determine that the session identifier in the URL of the request matches the session identifier for the account, and transmit, to the web browser, a web page at the URL. The server may receive, from the web browser, a cryptogram read by the web page via a card reader of the client device and decrypt the cryptogram. The server may authenticate the identity of the caller for the call based on decrypting the cryptogram and the session identifier of the URL matching the session identifier of the account.

20 Claims, 20 Drawing Sheets

(51) Int. Cl.
   *H04L 9/08* (2006.01)
   *H04M 3/42* (2006.01)
   *H04L 67/02* (2022.01)
   *G06K 7/10* (2006.01)
   *H04M 1/724* (2021.01)

(52) U.S. Cl.
   CPC ............ *H04L 9/0877* (2013.01); *H04L 67/02*
         (2013.01); *H04M 1/724* (2021.01); *H04M*
         *3/42042* (2013.01)

(58) Field of Classification Search
   CPC . H04L 63/0853; H04L 67/146; H04L 9/3228;
         H04L 9/3236; G06F 16/9566; G06F
         7/10297; H04M 1/724; H04M 3/42042;
         H04M 2203/6045; H04M 2250/04; H04M
         2250/14; H04M 7/0027; G06K 7/10297
   See application file for complete search history.

(56) References Cited

U.S. PATENT DOCUMENTS

| | | | | |
|---|---|---|---|---|
| 7,240,192 | B1* | 7/2007 | Paya | H04L 63/0807 |
| | | | | 726/28 |
| 7,478,434 | B1* | 1/2009 | Hinton | G06F 16/958 |
| | | | | 726/28 |
| 8,250,065 | B1* | 8/2012 | Chambers | G06F 16/954 |
| | | | | 707/723 |
| 8,424,057 | B2* | 4/2013 | Mardikar | H04W 12/128 |
| | | | | 713/168 |
| 8,856,869 | B1* | 10/2014 | Brinskelle | H04L 63/0823 |
| | | | | 726/2 |
| 9,164,671 | B2* | 10/2015 | Hilerio | H04L 67/02 |
| 9,220,000 | B1* | 12/2015 | Youngs | H04W 12/02 |
| 9,392,075 | B1* | 7/2016 | Radovnikovic | H04N 21/8586 |
| 9,578,500 | B1* | 2/2017 | Yeduvakula | H04L 63/18 |
| 9,674,344 | B1* | 6/2017 | Varman | H04W 4/16 |
| 9,894,199 | B1* | 2/2018 | Wiechman | H04M 3/42068 |
| 10,298,759 | B1* | 5/2019 | Ross | H04M 3/5183 |
| 10,523,708 | B1 | 12/2019 | Ilincic et al. | |
| 10,860,703 | B1* | 12/2020 | Manwiller | G06F 21/34 |
| 10,893,142 | B1* | 1/2021 | Burton | H04L 63/18 |
| 11,102,180 | B2* | 8/2021 | D'Agostino | H04L 63/0853 |
| 11,165,586 | B1* | 11/2021 | Rule | H04M 3/42042 |
| 2001/0023442 | A1* | 9/2001 | Masters | H04L 67/1001 |
| | | | | 709/227 |
| 2002/0048269 | A1* | 4/2002 | Hong | H04L 61/30 |
| | | | | 370/386 |
| 2002/0073152 | A1* | 6/2002 | Andrew | G06Q 30/02 |
| | | | | 709/204 |
| 2002/0087289 | A1* | 7/2002 | Halabieh | G06F 9/451 |
| | | | | 702/181 |
| 2002/0099936 | A1* | 7/2002 | Kou | H04L 69/329 |
| | | | | 713/151 |
| 2003/0061520 | A1* | 3/2003 | Zellers | H04L 63/083 |
| | | | | 713/150 |
| 2003/0097564 | A1* | 5/2003 | Tewari | H04L 67/5682 |
| | | | | 713/193 |
| 2004/0117486 | A1* | 6/2004 | Bourne | H04L 63/12 |
| | | | | 709/228 |
| 2005/0124288 | A1* | 6/2005 | Karmi | H04W 12/06 |
| | | | | 455/3.01 |
| 2005/0154887 | A1* | 7/2005 | Birk | G06F 21/41 |
| | | | | 713/168 |
| 2005/0198332 | A1* | 9/2005 | Laertz | H04L 63/0281 |
| | | | | 709/229 |
| 2005/0268100 | A1* | 12/2005 | Gasparini | H04L 63/168 |
| | | | | 713/170 |
| 2006/0056415 | A1* | 3/2006 | Lee | H04L 12/14 |
| | | | | 379/114.03 |
| 2006/0077959 | A1* | 4/2006 | Beckemeyer | H04L 61/4557 |
| | | | | 370/352 |
| 2007/0033392 | A1* | 2/2007 | Ganesan | H04L 9/0825 |
| | | | | 713/155 |
| 2007/0136279 | A1* | 6/2007 | Zhou | G06F 16/9566 |
| | | | | 707/E17.115 |
| 2007/0150603 | A1* | 6/2007 | Crull | H04N 21/4788 |
| | | | | 709/227 |
| 2008/0270571 | A1* | 10/2008 | Walker | H04L 63/083 |
| | | | | 709/218 |
| 2010/0088752 | A1* | 4/2010 | Nagulakonda | H04L 63/123 |
| | | | | 726/6 |
| 2010/0322404 | A1* | 12/2010 | Coleman | H04M 3/42068 |
| | | | | 370/352 |
| 2011/0047045 | A1* | 2/2011 | Brody | G06Q 20/326 |
| | | | | 705/26.41 |
| 2011/0211572 | A1* | 9/2011 | Campion | H04L 12/66 |
| | | | | 379/142.04 |
| 2011/0314114 | A1* | 12/2011 | Young, III | G06Q 30/02 |
| | | | | 709/224 |
| 2012/0174196 | A1* | 7/2012 | Bhogavilli | H04L 9/0825 |
| | | | | 726/22 |
| 2012/0272160 | A1* | 10/2012 | Spivack | G06N 5/046 |
| | | | | 715/752 |
| 2013/0276078 | A1* | 10/2013 | Rockwell | H04L 63/102 |
| | | | | 726/7 |
| 2014/0119532 | A1* | 5/2014 | Marghescu | H04M 3/5183 |
| | | | | 379/265.09 |
| 2014/0293832 | A1* | 10/2014 | Parikh | H04L 12/1403 |
| | | | | 370/259 |
| 2014/0372250 | A1* | 12/2014 | Dugan | G06Q 30/0631 |
| | | | | 705/26.7 |
| 2015/0039694 | A1* | 2/2015 | Yoon | H04L 12/1818 |
| | | | | 709/204 |
| 2015/0156328 | A1* | 6/2015 | Arslan | H04M 3/493 |
| | | | | 379/88.02 |
| 2015/0180967 | A1* | 6/2015 | Takagishi | H04L 67/02 |
| | | | | 709/204 |
| 2015/0244698 | A1* | 8/2015 | Zheng | H04L 63/08 |
| | | | | 726/7 |
| 2016/0191699 | A1* | 6/2016 | Agrawal | H04M 3/229 |
| | | | | 705/14.45 |
| 2017/0154366 | A1* | 6/2017 | Turgeman | G06F 21/316 |
| 2017/0201485 | A1* | 7/2017 | Kim | H04M 1/7243 |
| 2017/0213218 | A1* | 7/2017 | Pickering | G06Q 20/405 |
| 2019/0363885 | A1* | 11/2019 | Schiavoni | G06F 21/31 |
| 2020/0304542 | A1* | 9/2020 | Ilincic | H04M 3/5175 |
| 2020/0382311 | A1* | 12/2020 | Bueno | H04L 63/1483 |

\* cited by examiner

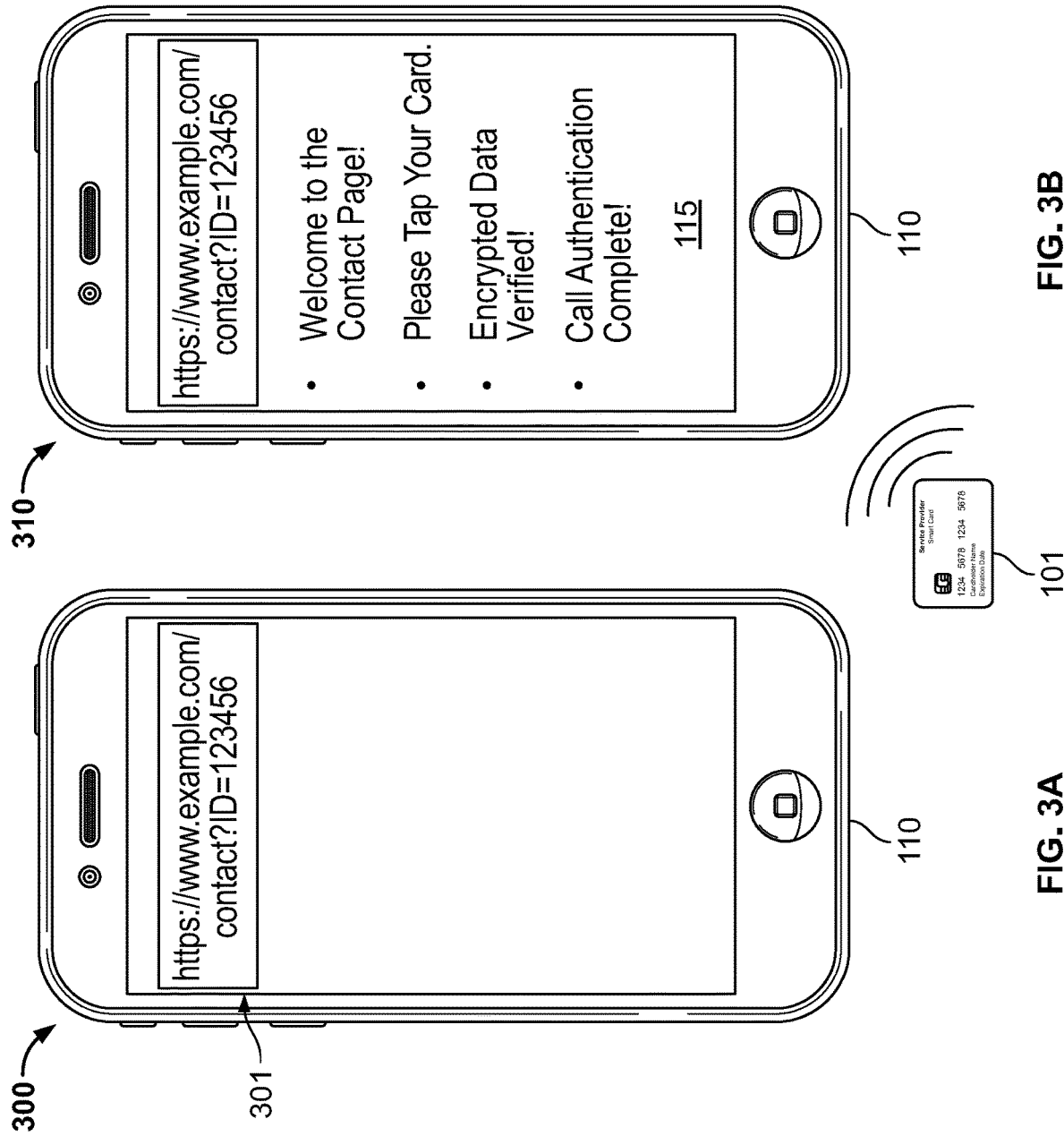

CALL CENTER WEB-BASED AUTHENTICATION USING A CONTACTLESS CARD

RELATED APPLICATIONS

This application is a continuation of U.S. patent application Ser. No. 17/085,768, now issued as U.S. Pat. No. 11,165,586, titled "CALL CENTER WEB-BASED AUTHENTICATION USING A CONTACTLESS CARD?" filed on Oct. 30, 2020. The contents of the aforementioned application are incorporated herein by reference in their entirety.

TECHNICAL FIELD

Embodiments disclosed herein generally relate to call center platforms, and more specifically, to secure, web-based authentication for call center calls using a contactless card.

BACKGROUND

Often, people make telephone calls to call centers provided by different entities, such as government agencies, businesses, educational institutions, and the like. For security reasons, authenticating the caller's identity is a prerequisite to providing customer service via call centers. Some conventional solutions may leverage dedicated applications to facilitate the authentication. However, some users may not have such dedicated applications installed on their computing device when making the call.

SUMMARY

Embodiments disclosed herein provide systems, methods, articles of manufacture, and computer-readable media for secure web-based authentication for call center calls using a contactless card. In one example, a server may receive a phone call from a client device. The server may generate a uniform resource locator (URL) comprising a session identifier as a parameter and associate the session identifier with an account. The server may transmit the URL to the client device. The server may receive, from a web browser of the client device, a request comprising the URL. The server may determine that the session identifier of the URL of the request matches the session identifier associated with the account, and transmit, to the web browser, a web page associated with the URL. The server may receive, from the web page in the web browser, a cryptogram read by the web page via a card reader of the client device and decrypt the cryptogram. The server may authenticate the account for the phone call, based on the decryption of the cryptogram and the session identifier of the URL matching the session identifier associated with the account. The server may, based on the authentication of the account, provide one or more attributes of the account to a graphical user interface displayed on a call center agent system assigned to the phone call.

BRIEF DESCRIPTION OF THE DRAWINGS

FIGS. 3A-3B illustrate embodiments of a system.

DETAILED DESCRIPTION

Figure 1A:
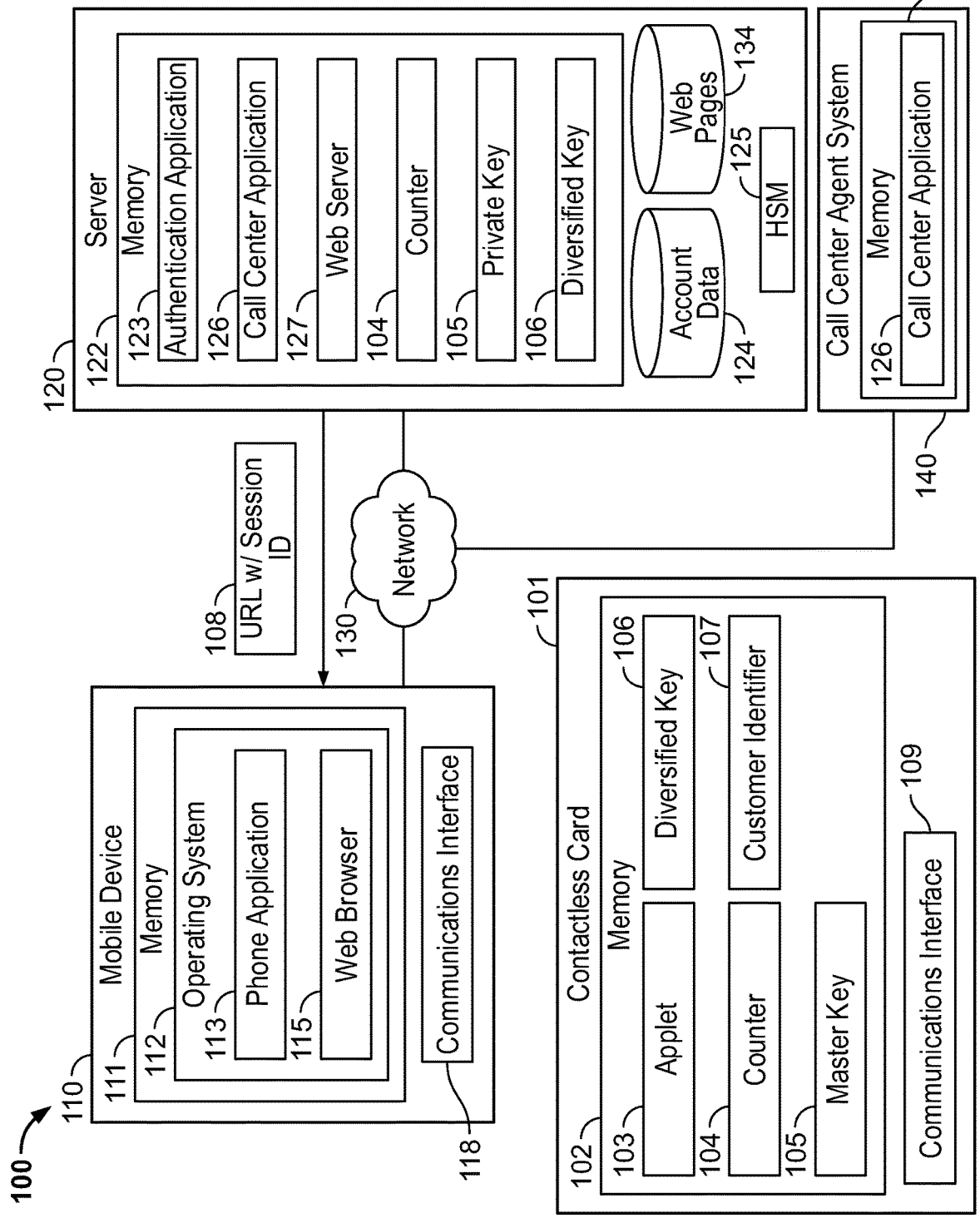
FIGS. 1A-1D illustrate embodiments of a system.

Embodiments disclosed herein provide techniques for secure authentication of identity using a contactless card and a computing device that does not have a dedicated application installed. For example, a bank or other financial institution may provide a call center system. Often, the bank may provide a dedicated application that may be used to access relevant account features. However, the user may not have such an application installed on any of their computing devices. Advantageously, however, embodiments disclosed herein may leverage a web browser to securely read data from a contactless card via near-field communications (NFC). As described in greater detail herein, the data read via NFC may be used to verify (or authenticate) the identity of a caller to a call center platform.

In one embodiment, a user may place a call to the call center. A call center system may generate a session identifier (ID) for the call. The call center system may associate the session ID with the account the caller indicates is the subject of the phone call (e.g., by storing the session ID in an account database record for the account). The call center system may then generate a uniform resource locator (URL) that includes the session ID as a parameter. The URL may generally be directed to one or more web pages associated with the call center. The call center system may then transmit the URL to a known device associated with the account, e.g., via a short message service (SMS) message, text message, email, system notification, etc.

Once received, a user may select the URL on the device, which causes the device to open a web browser that requests the resource at the specified URL. A web server associated with the call center system may receive the request from the web browser and identify the session ID. The web server may determine that the session ID specified in the URL matches the stored session ID generated for the account. If the session IDs match, the web server may transmit a web page associated with the URL to the web browser of the device. Once rendered in the web browser, the web page may include functionality for communicating with a contactless card, e.g., via NFC. The web page may instruct the user to tap the contactless card to the device. In response, the user may tap the contactless card to the device, and the web page and/or web browser may instruct the contactless card to generate a cryptogram, which may be included as part of an NFC Forum Data Exchange Format (NDEF) file. The web page and/or web browser may read the cryptogram and transmit the cryptogram to the server for decryption. The server may attempt to decrypt the cryptogram. If the server is able to decrypt the cryptogram and the session IDs match, the authentication of the caller may be completed. In such an example, one or more attributes of the account may be outputted on a graphical user interface (GUI) of a call center terminal (e.g., a system used by a call center agent who is speaking with the caller).

In another embodiment, the user may access a web page using the web browser on a computing device. The web page rendered in the web browser may instruct the user to tap the contactless card to the computing device. The web page and/or web browser may communicate with the contactless card to cause the contactless card to generate a cryptogram. The web page and/or web browser may read the cryptogram and transmit the cryptogram to the server for decryption. If the server is able to decrypt the cryptogram, the web server may determine whether one or more relevant cookies are saved by the web browser of the computing device. For example, a cookie may store a hash value associated with the user account. If the cookie is present and stores a hash value matching the hash value stored in the account database for the user account, the user's identity may be authenticated. If the hash values match, the web server and/or call center server may generate a session ID for the call. The session ID may be appended to a pre-authenticated phone number, e.g., following one or more special characters such as the hash "#" character. The web server may transmit the phone number including the session ID to the web browser of the computing device. Once selected, the computing device may initiate a phone call to the received number. Once the call is answered by the call center system, the computing device may automatically enter the session ID, thereby providing the session ID to the call center system. If the session ID entered by the computing device matches the session ID, the call may be authenticated and directly connected to a representative without requiring further authentication. The call center terminal used by the representative may automatically display the relevant account details in the GUI.

Advantageously, embodiments disclosed herein provide techniques to securely authenticate caller identities for call center calls. By leveraging cryptograms generated by contactless cards, embodiments of the disclosure may securely verify the identity of the caller with minimal risk of fraudulent activity. Furthermore, by using a web browser, a dedicated client application is not required to authenticate the caller and/or engage in data communications with the contactless card. Using a web browser may advantageously scale the functionality described herein to different entities and any number of users without requiring a dedicated application. Furthermore, by providing a simplified authentication process, more user calls may be handled by the call center system, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary system 100, consistent with disclosed embodiments. Although the system 100 shown in FIGS. 1A-1D has a limited number of elements in a certain topology, it may be appreciated that the system 100 may include more or less elements in alternate topologies as desired for a given implementation.

As shown, the system 100 comprises one or more contactless cards 101, one or more computing devices 110, one or more call center agent systems 140, and one or more servers 120. The contactless card 101 is representative of any type of payment card, such as a credit card, debit card, ATM card, gift card, and the like. The contactless card 101 may comprise one or more communications interfaces 109, such as a radio frequency identification (RFID) chip, configured to communicate with a communications interface 118 of the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi.

The computing device 110 and the call center agent systems 140 are representative of any number and type of computing device, such as smartphones, tablet computers, wearable devices, laptops, portable gaming devices, virtualized computing system, merchant terminals, point-of-sale systems, servers, desktop computers, and the like. The server 120 is representative of any type of computing device, such as a server, workstation, compute cluster, cloud computing platform, virtualized computing system, and the like. Although not depicted for the sake of clarity, the computing device 110, contactless card 101, server 120, and agent system 140 each include one or more processor circuits to execute programs, code, and/or instructions.

As shown, a memory 102 of the contactless card 101 includes an applet 103, a counter 104, a master key 105, a diversified key 106, and a unique customer identifier (ID) 107. The applet 103 is executable code configured to perform the operations described herein. The counter 104, master key 105, diversified key 106, and customer ID 107 are used to provide security in the system 100 as described in greater detail below.

As shown, a memory 111 of the computing device 110 includes an operating system (OS) 112, a phone application 113, and a web browser 115. Example operating systems 112 include the Android® OS, iOS®, macOS®, Linux®, and Windows® operating systems. The phone application 113 (also referred to as a "dialer" application) is an application that allows the device 110 to place and/or receive telephone calls. For example, in embodiments where the computing device 110 is a smartphone, the phone application 113 allows the user to make and/or receive telephone calls via a cellular network (not pictured) and/or via the network 130 (e.g., via the Internet). The web browser 115 is an application that allows the device 110 to access information via the network 130 (e.g., via the Internet).

As shown, a memory 122 of the server 120 includes an authentication application 123, a call center application 126, and a web server 127. Although depicted as separate components of the server 120, in some embodiments, the authentication application 123, call center application 126, and/or the web server 127 may be integrated into a single component, e.g., a single application including all associated functionality described herein. Similarly, although depicted as part of the server 120, in some embodiments, the authentication application 123, call center application 126, and/or the web server 127 may be implemented in separate servers. Furthermore, the authentication application 123, call center application 126, and/or the web server 127 may be implemented in hardware, software, and/or a combination of hardware and software. Further still, the instances of the call center application 126 of the server 120 and/or the agent system 140 are generally configured to perform all disclosed operations related to the call center application 126.

As described in greater detail herein, the authentication application 123 is configured to facilitate authentication for calls to the call center application 126 based on encrypted data generated by the contactless card 101. The web server 127 is generally configured to process client requests for web pages 134 from the web browsers 115. In at least one embodiment, the web server 127 and the browsers 115 communicate via the hypertext transfer protocol (HTTP).

The call center application 126 generally provides functionality for a call center system whereby a plurality of phone calls may be answered, routed, forwarded, and/or otherwise processed. For example, a caller may dial one of a plurality of phone numbers associated with the call center application 126. The call center application 126 of the server 120 may answer the call, optionally receive input from the user, and/or route the call to one of a plurality of call center agent systems 140 for handling by an agent. In some embodiments, the call center application 126 provides a virtual call center such that the agent systems 140 may be geographically diverse, e.g., not in a centralized location. Each call center agent system 140 includes an instance of the call center application 126 that interfaces with the call center application 126 of the server 120, e.g., to accept and/or manage telephone calls received from customers routed to the agent systems 140 by the server 120. More generally, the call center application 126 may include one or more GUIs to display attributes of a call, a caller, an account, and/or any other relevant information as described herein.

Continuing with the previous example, the call center application 126 of the server 120 may route the caller's call to a first agent system 140. To assist the customer, the agent may need to access one or more account details for the customer in the account data 124. However, to preserve the security of the account data 124, the system 100 must authenticate the identity of the caller and/or the call. In the embodiment depicted in FIG. 1A, the call center application 126 of the server 120 may generate a session ID for the call and associate the session ID with the account in a record in the account data 124. The session ID may be any unique alphanumeric identifier of any suitable length, such as a hash value 32 characters in length. The call center application 126 of the server 120 may further assign a time limit, or duration, to the session ID, such as 45 seconds, 2 minutes, 10 minutes, etc. The call center application 126 of the server 120 may further associate the session ID with an identifier for the agent assigned to the call, such as unique agent identifier, an identifier of the device 140 used by the agent assigned to the call, and/or an identifier of the instance of the call center application 126 used by the agent assigned to the call. The call center application 126 of the server 120 may then generate a URL 108 that includes the session ID as a parameter. The URL 108 (and any other URL disclosed herein) may be directed to any component of the server 120 and/or any resource associated with the server 120. For example, if the session ID is "ABC123", the URL with session ID 108 may be "http://www.example.com/webauth.html?ABC 123". In such an example, the "http://www.example.com/webauth.html" portion of the URL may generally be directed to the server 120, one or more web pages 134 managed by the web server 127, any component of the server 120, and/or any resource associated with the server 120.

Generally, the web pages 134 may include hypertext markup language (HTML) pages, JavaScript® pages, and/or any other type of page that can be rendered by a web browser 115. In some embodiments, the web pages 134 and/or URL 108 may be directed to the call center application 126 and/or authentication application 123. In some embodiments, the web pages 134 may provide access to functionality provided by the call center application 126 and/or authentication application 123. Furthermore, in some embodiments, the web pages 134 may be directed to web-based front-ends exposed by the call center application 126 and/or authentication application 123.

In one embodiment, the call center application 126 of the server 120 generates the session ID and the URL 108 responsive to input received from the agent via the call center application 126 on the agent system 140. The input may include an indication of the account number the customer has requested to access. In some embodiments, the call center application 126 may programmatically generate the URL 108 and/or session ID based on determining that the phone number from which a call is received is stored in the account data 124 as being associated with an account.

If the received phone call is from the number associated with the account in the account data 124, the call center application 126 of the server 120 may then transmit the URL with session ID 108 to a device associated with the subject account in the account data 124. For example, the call center application 126 of the server 120 may identify a mobile phone number associated with the account in the account data 124 and send an SMS message to the specified mobile phone number. In another example, the call center application 126 of the server 120 may include the URL with session ID 108 in an email sent to a known email address of the customer. Generally, the URL with session ID 108 may be transmitted via any suitable technique. In some embodiments, the phone call may be received from a first number associated with the account and the URL with session ID 108 may be transmitted to a second phone number associated with the account. Embodiments are not limited in this context.

Figure 1B:
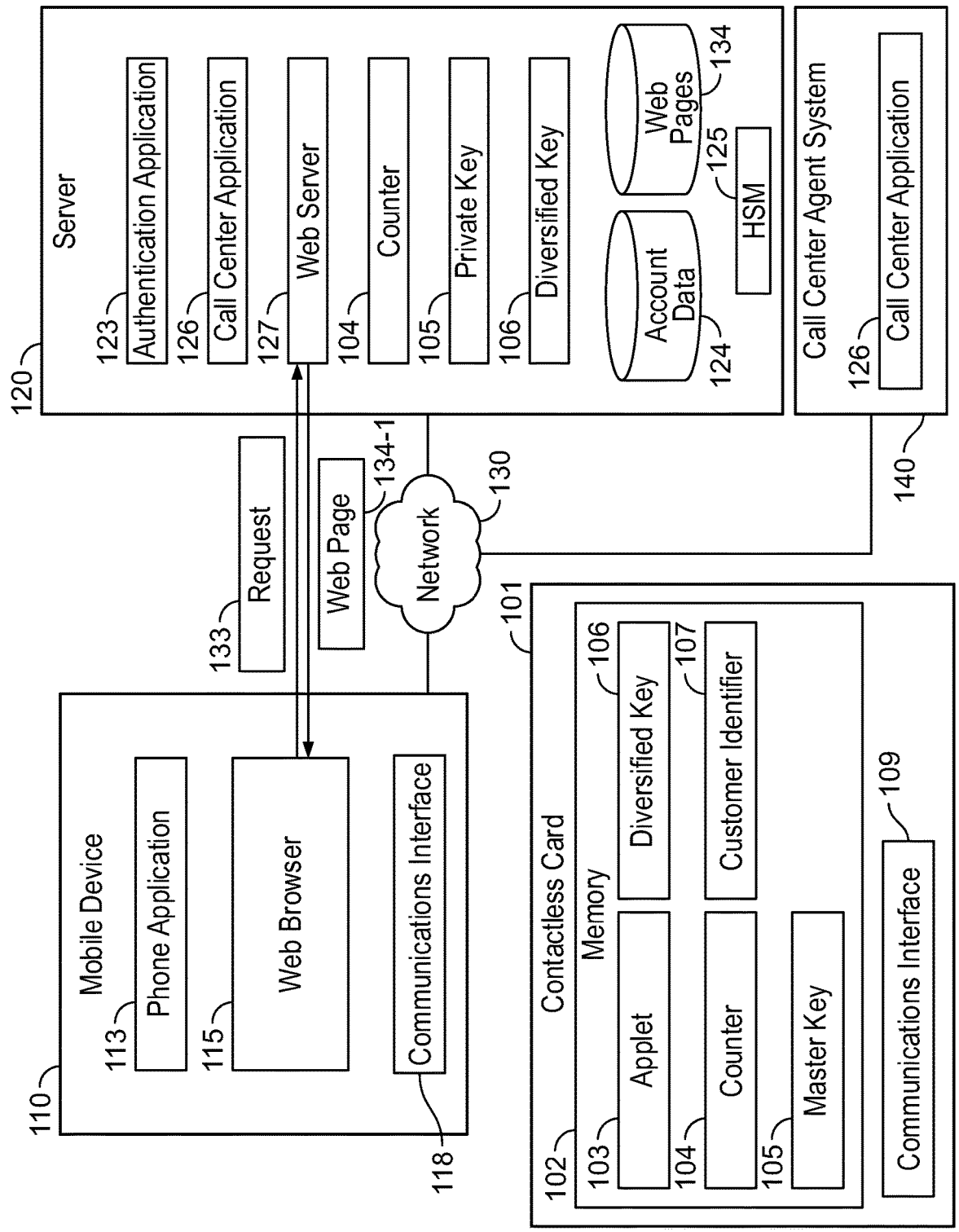

FIG. 1B depicts an embodiment where the device 110 receives the URL with session ID 108 from the server 120. The user may select the URL 108, which causes the web browser 115 to generate an HTTP request 133 that specifies the URL 108. The web server 127 may receive and process the request 133. In at least one embodiment, the web server 127 may extract the session ID from the URL 108 and compare the session ID to the session ID stored in the account data 124. If a match does not exist, the authentication may fail, and the web server 127 may return an indication of the failed authentication to the devices 110, 140. Similarly, the web server 127 may determine whether the time limit has elapsed for the session ID. For example, if the time limit is 10 minutes, and the request 133 is received 15 minutes after the session ID is created, the time limit is exceeded, and the authentication fails. Otherwise, if a match exists and the time limit is not exceeded, the web server 127 may send a response that includes a web page 134-1. Furthermore, if the match exists and the time limit is not exceeded, the web server 127 and/or call center application 126 may provide a corresponding indication to the call center application 126 of the agent device 140.

Figure 1C:
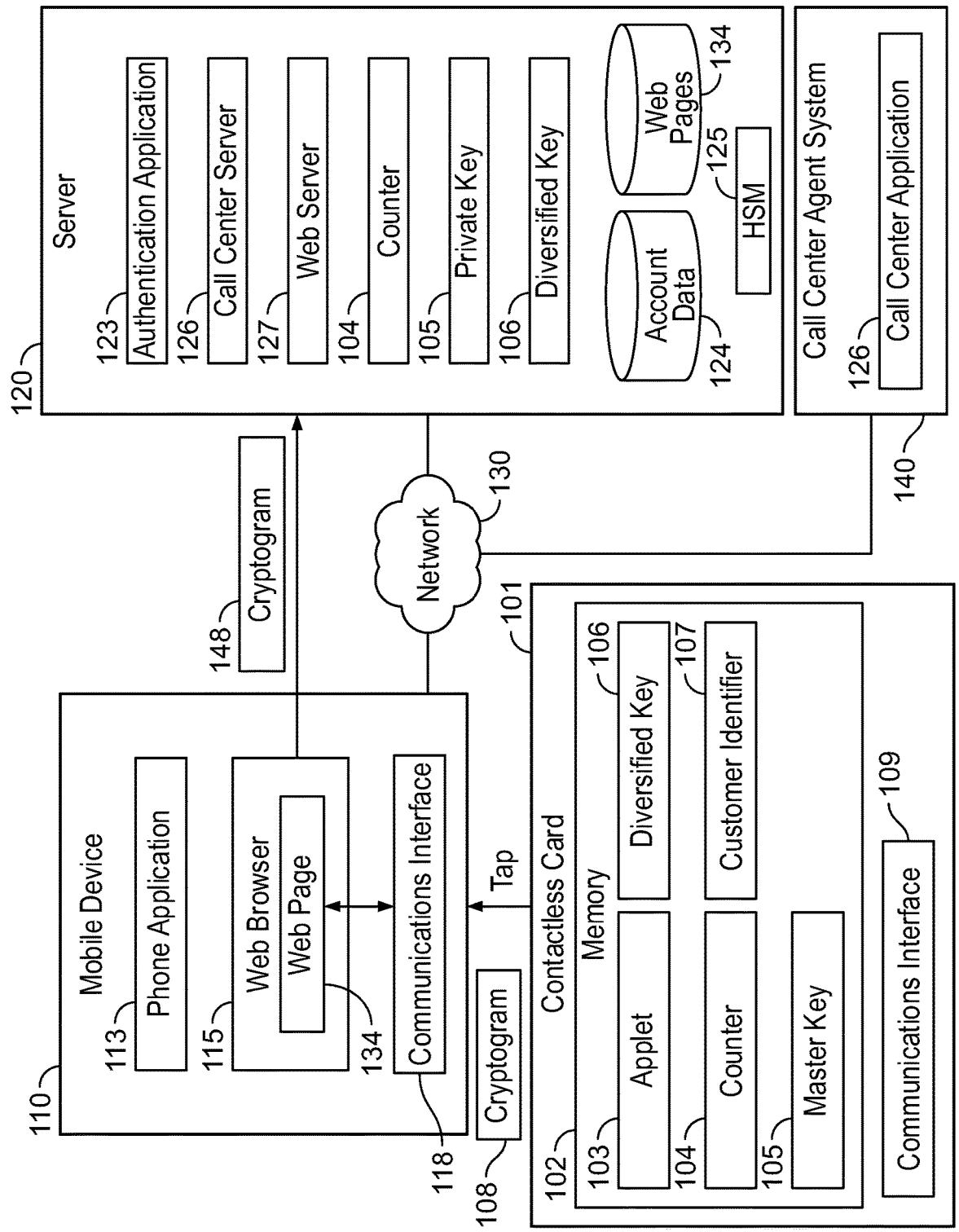

FIG. 1C depicts an embodiment where the web browser 115 has loaded the web page 134-1. Advantageously, the web page 134-1 includes functionality to wirelessly read data generated by the contactless card 101 and/or wirelessly write data to the memory 102 of the contactless card 101. More generally, a given web page 134 and/or the web browser 115 may include functionality control the communications interface 118 and communicate with the card 101 without requiring a dedicated operating system application (e.g., an application store application) to perform these functions. In at least one embodiment, the functionality is provided via one or more application programming interfaces (APIs). The APIs may be defined by the Web NFC Draft Community Group Report. Therefore, the web page 134-1 (and any other web pages 134) may control the NFC capabilities of the communications interface 118 without requiring a dedicated application.

In some embodiments, the web page 134-1 in the web browser 115 may output an indication requesting or instructing the user to tap the contactless card 101 to the device 110 to authenticate the account for the phone call. Generally, once the contactless card 101 is brought within communications range of the communications interface 118 of the device 110, the applet 103 of the contactless card 101 may generate a cryptogram 148. The cryptogram 148 may be based on the customer ID 107 of the contactless card 101. The cryptogram 148 may be generated based on any suitable cryptographic technique. In at least one embodiment, the cryptogram 148 is included in an NDEF file. The NDEF file may indicate that the cryptogram 148 was read from the contactless card 101 via the card reader 118 of the device 110.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the master key 105 and the data as input a cryptographic algorithm. For example, encrypting the customer ID 107 with the master key 105 may result in the encrypted customer ID included in the cryptogram 148. Similarly, the server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the device 110). When preparing to send data (e.g., to the server 120 and/or the device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in the encrypted customer ID included in the cryptogram 148. The web browser 115 and/or the web page 134 may then read the cryptogram 148 via the communications interface 118.

Regardless of the encryption technique used, the web page 134 and/or web browser 115 may then transmit the cryptogram 148 to the server 120 via the network 130. The web page and/or web browser 115 may further indicate, to the server 120, that the cryptogram 148 was read from the contactless card 101 via the card reader 118 of the device 110. Once received, the authentication application 123 may attempt to authenticate the cryptogram 148. For example, the authentication application 123 may attempt to decrypt the cryptogram 148 using a copy of the master key 105 stored by the server 120. In another example, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the cryptogram 148.

Regardless of the decryption technique used, the authentication application 123 may successfully decrypt the cryptogram 148, thereby verifying or authenticating the cryptogram 148 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the cryptogram 148 using the keys 105 and/or 106 and a cryptographic function. Similarly, the secure element and/or HSM 125 may generate the diversified key 106 based on the master key 105 and counter value 104 as described above. If the decryption is successful and the session ID of the URL 108 matches the session ID stored in the account data 124, the phone call may be authenticated.

If, however, the authentication application 123 is unable to decrypt the cryptogram 148 to yield the expected result (e.g., the customer ID 107 of the account associated with the contactless card 101), the authentication application 123 does not validate the cryptogram 148. In such an example, the authentication application 123 transmits an indication of the failed authentication to the web browser 115, the call center application 126 of the server 120, and/or the call center application 126 of the agent system 140. The call center application 126 and/or call center application 126 may then restrict access to the client data from the account data 124 to preserve the security of the account.

Figure 1D:
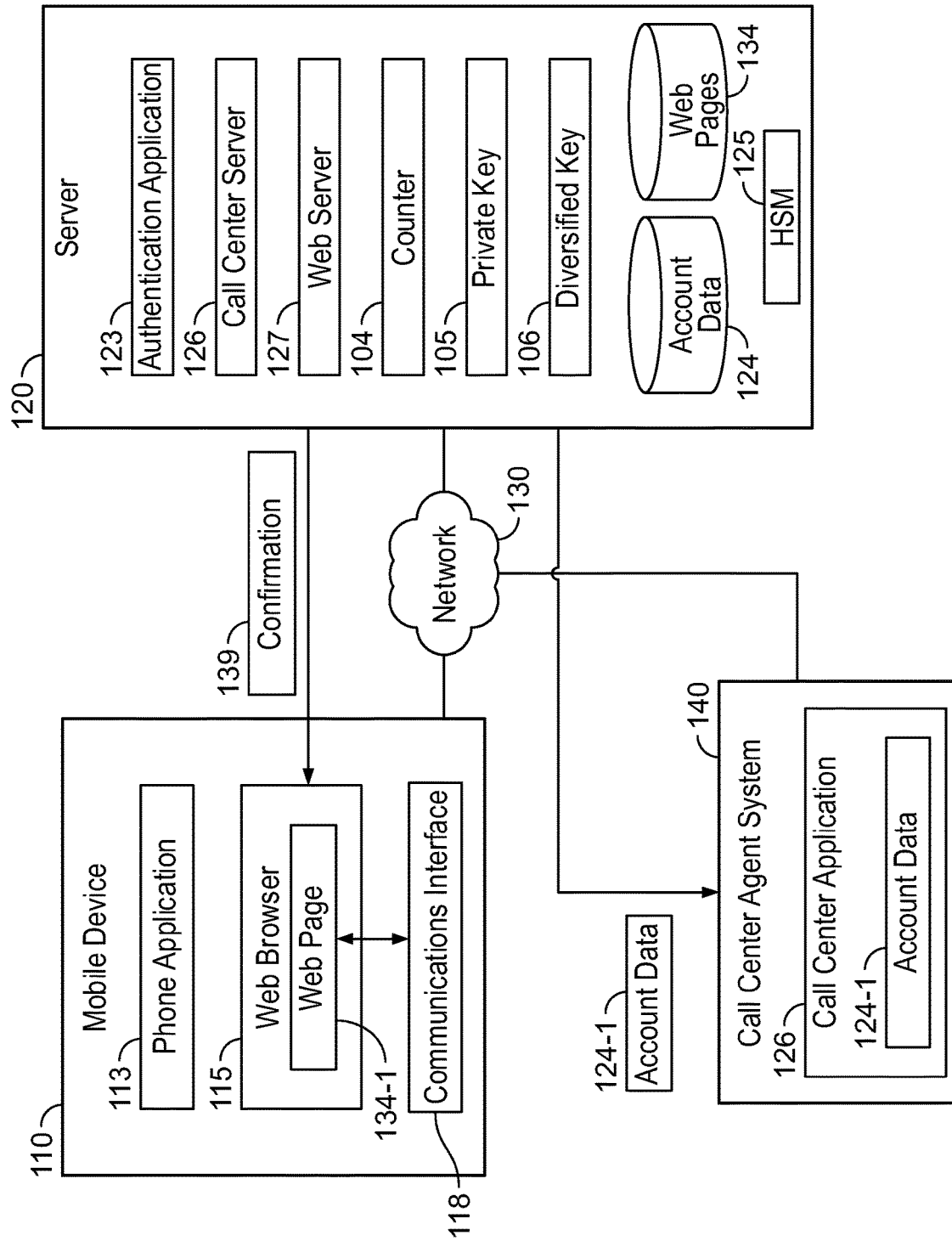

FIG. 1D illustrates an embodiment where the authentication application 123 has successfully decrypted the cryptogram 148, thereby verifying (or authenticating) the cryptogram, and by association, the identity of the user placing the phone call. As shown, the authentication application 123 transmits a confirmation 139 to the device 110, where the confirmation 139 indicates that the authentication application 123 successfully decrypted the cryptogram 148 and that the session ID of the URL 108 matches the session ID stored in the account data 124. The web page 134-1 may be updated to reflect the confirmation 139. In another embodiment, the confirmation 139 is a web page 134, and the web browser 115 may display the confirmation 139 web page 134.

Although not depicted, the authentication application 123 may provide the confirmation 139 to the web server 127, call center application 126 of the server 120, and/or the call center application 126 of the call center agent system 140 assigned to the phone call. Furthermore, as shown, the call center application 126 may transmit one or more elements of account data 124-1 to the call center application 126 of the agent system 140 used by the agent assigned to the call, e.g., based on the one or more agent identifiers associated with the session ID. Doing so displays different account attributes in one or more GUIs provided by the call center application 126, such as name, address, or other user information. In another embodiment, the account data 124-1 is already stored by the call center application 126 but is obfuscated or otherwise not exposed via the GUI of the call center application 126 until the account is authenticated for the call. In such an example, the GUI of the call center application 126 may expose the stored elements of account data 124 when receiving the confirmation 139, or another indication from the server 120, indicating the session ID matches the stored session ID, the session ID has not expired, and the cryptogram 148 was successfully decrypted.

Advantageously, the caller is authenticated and the account data 124-1 is exposed via the call center application 126 on the agent system 140 without requiring the device 110 to execute a dedicated client application provided by an entity associated with the call center application 126 (e.g., the application provided by the financial institution associated with the contactless card 101).

Figure 2A:
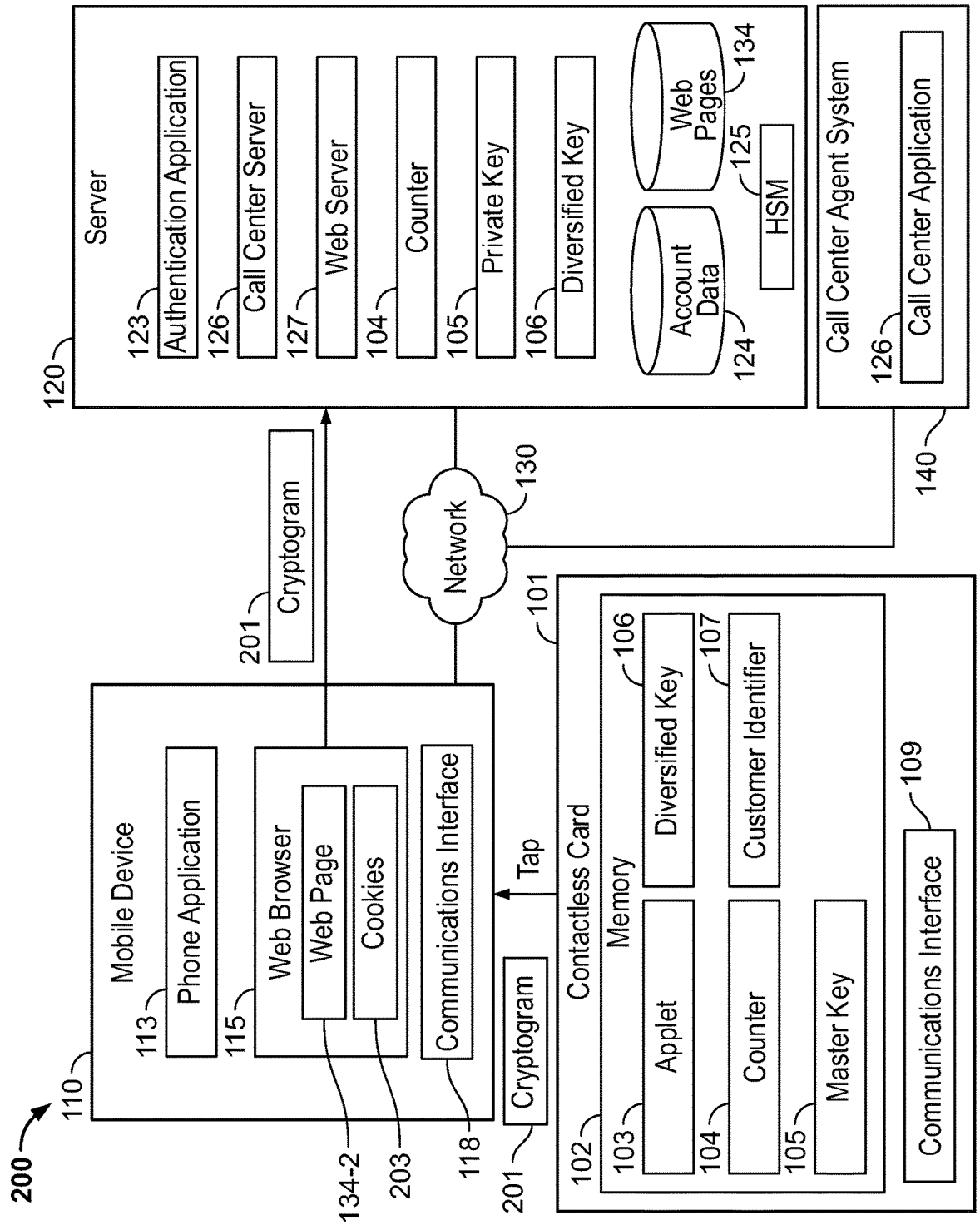
FIGS. 2A-2E illustrate embodiments of a system.

FIG. 2A depicts a schematic of an exemplary system 200, consistent with disclosed embodiments. Although the system 200 shown in FIGS. 2A-2E has a limited number of elements in a certain topology, it may be appreciated that the system 200 may include more or less elements in alternate topologies as desired for a given implementation.

Generally, FIGS. 2A-2E depict embodiments of using the contactless card 101 to initiate a pre-authenticated call between the device 110 and the call center application 126 of the server 120. As shown, the web browser 115 of the device 110 has loaded a web page 134-2. The web page 134-2 is received from the web server 127 responsive to a request to access the web page 134-2. The web page 134-2 may include similar capabilities to the web page 134-1, including the ability to communicate with the contactless card 101, e.g., by reading data generated by the contactless card 101 and/or writing data to the memory of the contactless card 101. The web page 134-2 and/or the web browser 115 may therefore generally be able to control the NFC capabilities of the communications interface 118 to communicate with the contactless card 101 via NFC.

In the embodiment depicted in FIG. 2A, the web page 134-2 may instruct the user to tap the contactless card 101 to initiate a pre-authenticated call to the call center application 126 of the server 120. The user may then tap the card 101 to the device 110.

Doing so causes the applet 103 of the contactless card 101 to generate a cryptogram 201 (e.g., an encrypted customer ID 107) based on the customer ID 107 and a diversified key 106 as described above. The web browser 115 and/or the web page 134-2 may then read the cryptogram 201, e.g., via NFC. In some embodiments, the applet 103 includes an unencrypted customer ID 107 and/or some other user identifier in a data package with the cryptogram 201 to allow the server 120 to perform the relevant decryption operations. Once read, the web browser 115 and/or the web page 134-2 may transmit the cryptogram 201 to the authentication application 123 for processing. The web page 134-2 and/or web browser 115 may further indicate, to the authentication application 123, that the cryptogram was read from the contactless card 101 via the card reader 118 of the device 110.

Once received, the authentication application 123 may attempt to verify the cryptogram. In at least one embodiment, the unencrypted customer ID 107 provided by the applet 103 may be used to identify the relevant account, counter value 104, and/or master key 105 in the account data 124. The authentication application 123 may attempt to decrypt the cryptogram by providing the master key 105 and incremented counter value 104 as input to the cryptographic algorithm, which produces the diversified key 106 as output. The resulting diversified key 106 may correspond to the instance of the diversified key 106 generated by the contactless card 101 to create the cryptogram 201, which may be used to decrypt the cryptogram. Generally, the authentication application 123 may transmit a decryption result to the web browser 115 and/or the web page 134-2 indicating whether the decryption was successful or unsuccessful.

Figure 2B:
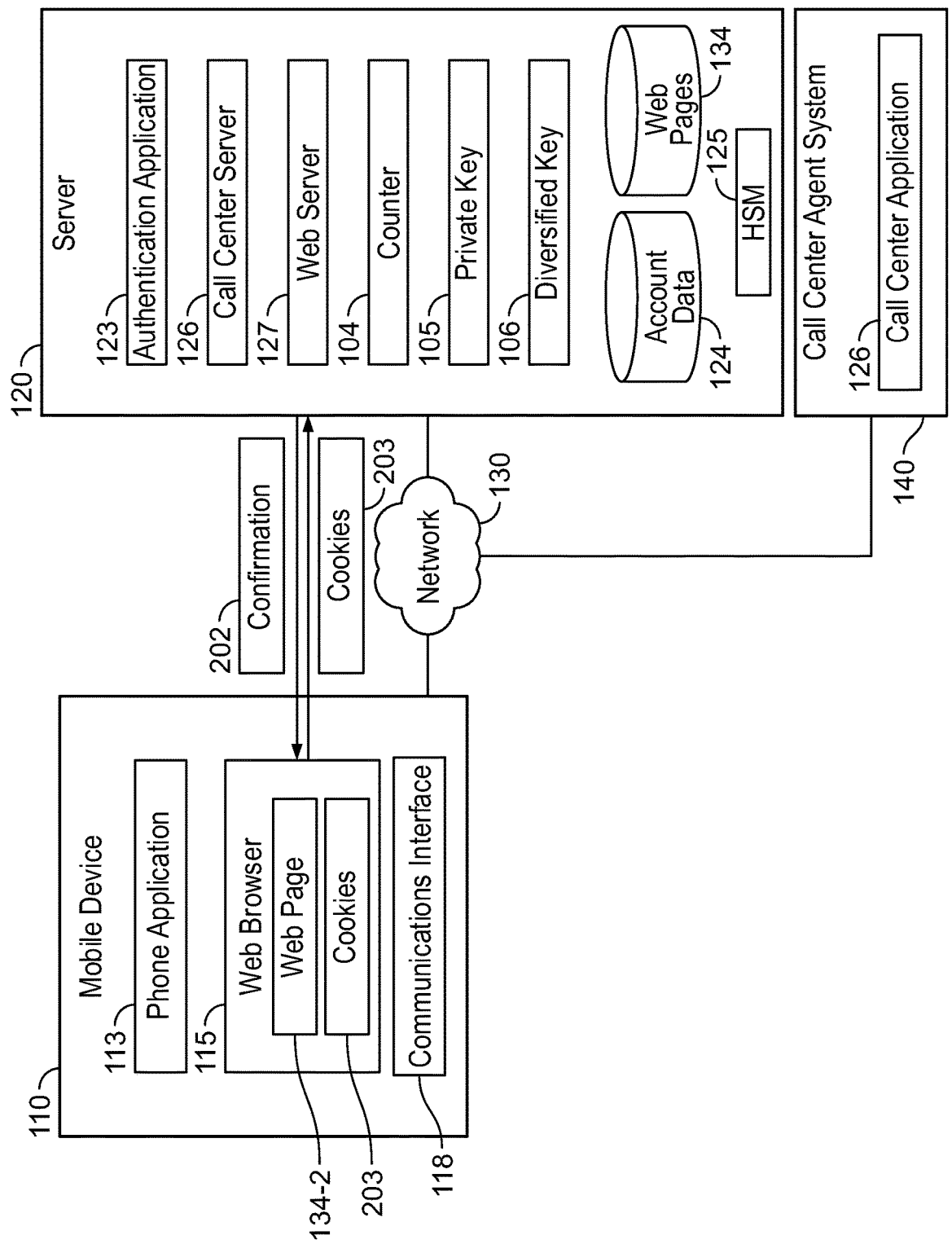

FIG. 2B depicts an embodiment where the server 120 transmits a confirmation 202 to the device 110. The confirmation 202 generally includes a decryption result indicating that the cryptogram 201 was authenticated, verified, or otherwise successfully decrypted. The web browser 115 and/or the web page 134-2 may receive the confirmation 202, which may further include instructions to provide one or more cookies 203 of the web browser 115 to the web server 127. Generally, the cookies 203 may include a hash value or other identifier used to indicate that the web browser was used to successfully authenticate the account associated with the customer ID 107. In response, the web browser 115 and/or the web page 134-2 may transmit the relevant cookie(s) 203 to the web server 127.

Once received, the web server 127 may determine whether the cookie 203 has expired based on a date of the cookie, whether the hash value in the cookie is a valid hash value assigned to the account in the account data 124, and any other type of processing of the cookie 203. If the cookie 203 is not validated, e.g., based on an invalid hash value and/or an expired cookie, one or more alternate forms of authentication may be required. For example, the web server 127 and/or call center application 126 may transmit a one-time password (OTP) to a device associated with the account in the account data 124. If the user provides the correct code (e.g. via the web page 134-2), the OTP may be validated in lieu of the cookie 203. In another embodiment, the web server 127 and/or call center application 126 of the server 120 may perform a stability check on one or more phone numbers reflected in the account data 124 for the account. For example, if the phone number has been stored in the account data 124 for a time period greater than a threshold amount of time (e.g., 1 week, 1 month, etc.), the phone number may be validated in lieu of the cookie 203. If the cookie validation, OTP validation, and/or phone number stability check fail, an indication of the failure is transmitted to the web browser 115 and/or the web page 134-2.

Figure 2C:
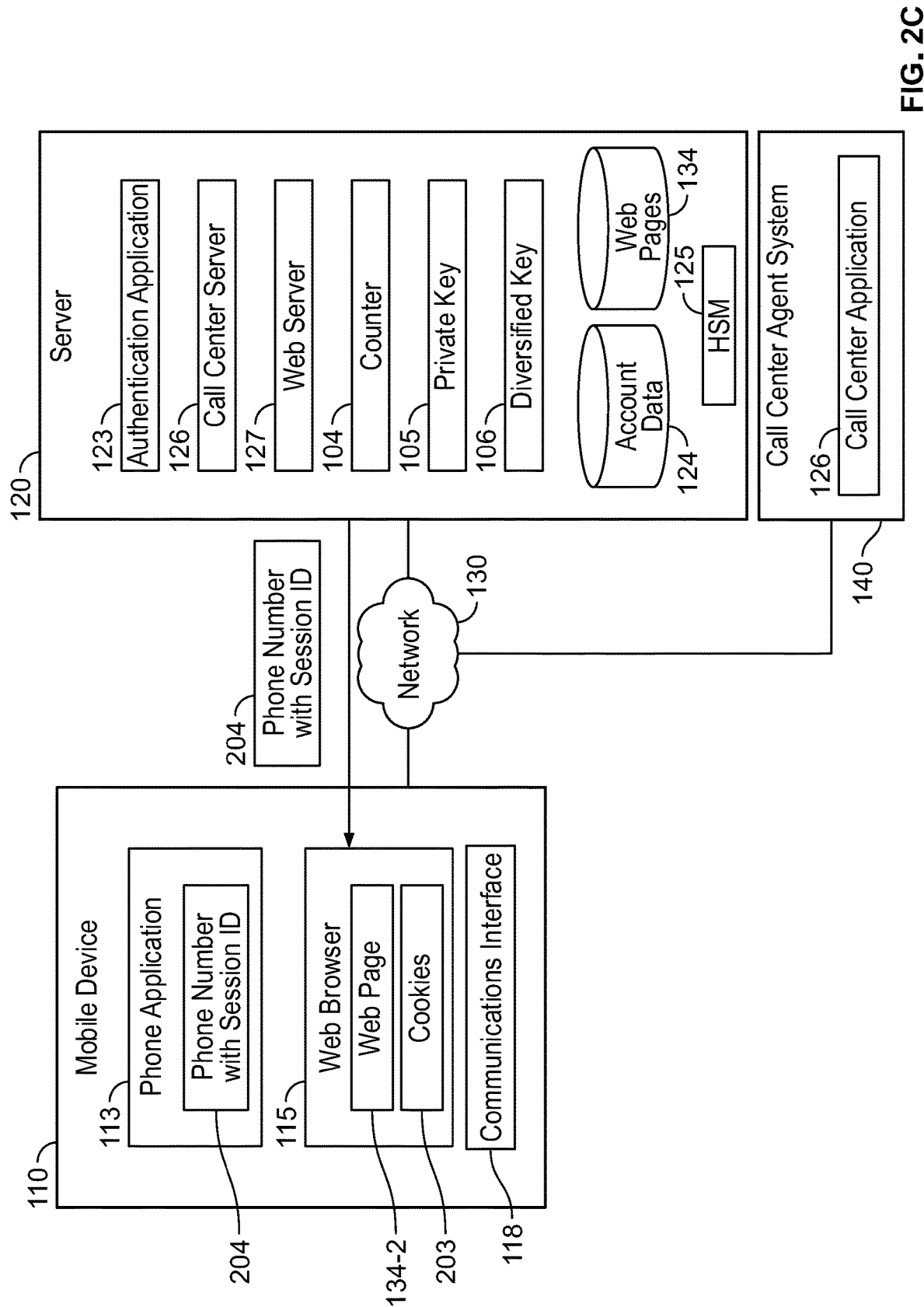

FIG. 2C reflects an embodiment where the web server 127 validated the cookies 203 received from the web browser 115. However, FIG. 2C may further reflect an embodiment where the OTP is validated and/or the phone number stability check reveals the phone number has been registered to the account for an amount of time greater than the threshold.

Based on the validation of the cookies 203, the call center application 126 of the server 120 may generate a session ID for a pre-authenticated call. The session ID may be a hash value or other unique identifier that is associated with the account and a phone number associated with the account in the account data 124. The session ID may further be associated with a time limit, such as 30 seconds, 10 minutes, 30 minutes, etc. The call center application 126 of the server 120 may then select a pre-authenticated phone number from among a plurality of pre-authenticated phone numbers and append the session ID as a parameter of the phone number to generate a phone number with session ID 204. For example, if the pre-authenticated phone number is 1-555-555-1212, and the session ID is "56789", the phone number including the session ID 204 may be "1-555-555-1212#56789". The call center application 126 of the server 120 may provide the phone number with session ID 204 to the web server 127. The web server 127 may then transmit the phone number with session ID 204 to the web browser 115. Additionally and/or alternatively, the call center application 126 of the server 120 may transmit the phone number with session ID 204 to the device 110 via other methods, such as SMS message, email, etc. Once received, the user may select the phone number with session ID 204 to initiate a call to the call center application 126 of the server 120 at the pre-authenticated number. In some embodiments, the web server 127 may update the cookies 203 (e.g., to include a new expiration date and/or a new hash value) based on the validation of the cookies 203 and/or the decryption of the cryptogram 201. Further still, if a cookie 203 does not exist, the web server 127 may store (or write) a cookie 203 in the web browser 115 based at least in part on the decryption of the cryptogram 201. The web server 127 may also update the account data 124 to reflect the new and/or updated cookies 203.

In some embodiments, the cookies 203 may be processed prior to and/or contemporaneously with the generation and/or processing of the cryptogram 201. In such examples, the cookies 203 may specify a hash value which corresponds to one or more accounts in the account data 124. Doing so allows the server 120 to identify the master key 105 and counter value 104 of the corresponding account to generate a diversified key 106 and decrypt the cryptogram 201 without requiring the contactless card 101 and/or the web browser 115 to provide the customer ID 107 to the server 120. Similarly, if the cookies are not validated (e.g., a cookie does not exist and/or includes an expired or otherwise invalid hash value), the server 120 may refrain from decrypting the cryptogram 201 to conserve resources.

Figure 2D:
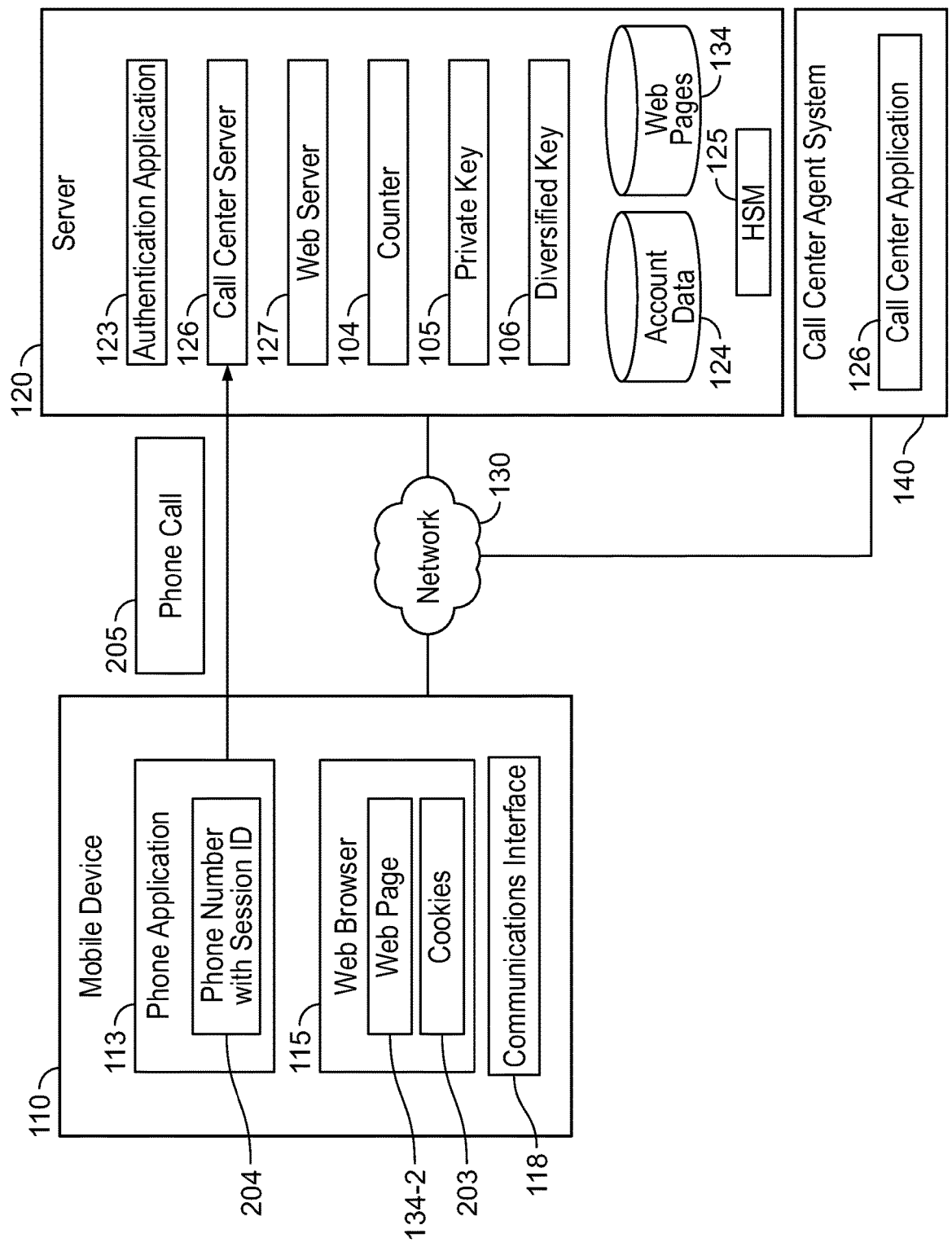

FIG. 2D depicts an embodiment where a phone call 205 is initiated by the phone application 113 of the client device 110. The phone call 205 may be directed to the phone number with session ID 204. Once answered by the call center application 126 of the server 120, the phone application 113 may provide the session ID as input, e.g., by programmatically entering the digits "56789" after some initial delay.

The call center application 126 of the server 120 may then determine whether the phone call 205 is directed to one of the plurality of pre-authenticated numbers. The call center application 126 of the server 120 may then receive the session ID from the phone application 113 and determine whether the session ID is valid. For example, the call center application 126 of the server 120 may compare the session ID to the session ID stored in the account data 124. If a match exists, the call center application 126 of the server 120 may determine whether the time limit for the session ID has not expired (e.g., whether the call is received within a threshold amount of time from when the session ID was generated). Additionally, the call center application 126 of the server 120 may determine whether the call is received from a phone number associated with the account in the account data 124. If the phone call is directed to one of the plurality of pre-authenticated numbers, that the session ID is valid and has not expired, and the phone call is received from a phone number associated with the account in the account data 124, the call center application 126 of the server 120 may authenticate the pre-authenticated call. Otherwise, the call center application 126 of the server 120 may reject the pre-authenticated call, or perform another operation for the call (e.g., requiring the user to authenticate using other methods when speaking to the customer service agent).

Figure 2E:
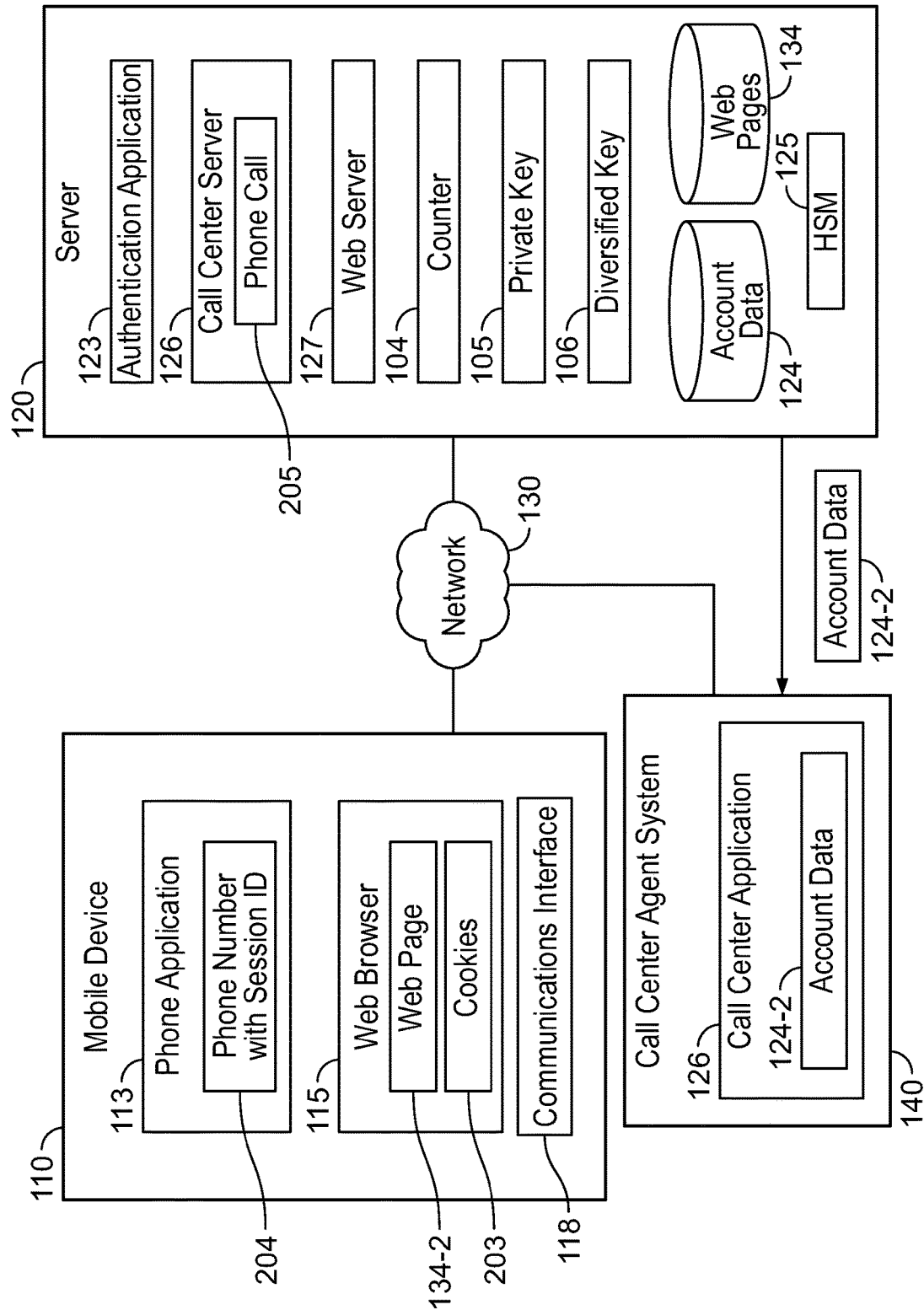

FIG. 2E depicts an embodiment where the call center application 126 has authenticated the pre-authenticated call 205. Generally, when a pre-authenticated call is authenticated as described above, the call 205 may be directly connected to an agent without requiring the user to wait while the agents handle calls from other callers. For example, if 10 callers are in a queue waiting to have calls handled, the pre-authenticated call 205 may be answered and handled prior to the other 10 calls in the queue, as the pre-authenticated call 205 is placed at the front of the queue. Similarly, the user is not required to provide any information when connected to the agent. Further still, as shown in FIG. 2E, the call center application 126 of the server 120 may provide account data 124-1 to the call center application 126 of the agent system 140. Doing so allows the agent to view the relevant account details as the call is connected and without requiring additional input from the caller. In some embodiments, the web server 127 may update the cookies 203 (e.g., to include a new expiration date and/or a new hash value) based on the authentication of the pre-authenticated call. Further still, if a cookie 203 does not exist, the web server 127 may store a cookie 203 in the web browser 115 based at least in part on the decryption of the cryptogram 201. The web server 127 may also update the account data 124 to reflect the new and/or updated cookies 203.

FIG. 3A is a schematic 300 illustrating an example mobile computing device 110. As shown, a mobile device 110 has received a URL 301. The URL 301 may include a session ID parameter, e.g., the "123456" portion of the URL 301. The session ID parameter may be generated responsive to a call placed by a user of the device 110 to the call center application 126. The call center application 126 of the server 120 may route the call to an agent. The agent may use the agent system 140 to instruct the call center application 126 of the server 120 to generate the session ID and URL 301 for the customer. The session ID parameter may be associated with the account, the phone call, and/or the agent assigned to the phone call in the account data 124. The session ID may be restricted to a limited time of validity, e.g., 10 minutes. The call center application 126 of the server 120 may then transmit the URL 301 to the device 110. The URL 301 may generally be directed to a web page 134 and/or any other resource associated with the server 120. In some embodiments, the URL 301 is directed to one or more web pages 134 associated with the call center application 126 and/or web server 127. The URL 301 may be specified in a text message or other type of message sent to the device 110. Once selected, the web browser 115 may be opened to access resource at the URL 301.

FIG. 3B is a schematic 310 depicting an embodiment where the web page at the URL 301 has been accessed. Because the URL 301 includes the session ID parameter, the web server 127, call center application 126, or any other component of the server 120 may extract the session ID parameter and compare the extracted session ID parameter to the session ID parameter stored in the account data 124. If the comparison results in a match, the web server 127, call center application 126, or any other component of the server 120 may determine whether the web page at the URL is accessed (or requested) within the time threshold for the session ID, e.g., within 10 minutes continuing with the previous example. If the web page is accessed within the time threshold, the web server 127, call center application 126, or any other component of the server 120 may validate the session ID.

In response, the web server 127, call center application 126, or any other component of the server 120 updates the web page in the web browser 115 (and/or loads a new web page in the web browser 115) to instruct the user to tap the contactless card 101 to the mobile device 110. The user may tap the contactless card 101 to the device 110. Doing so causes the web browser 115 and/or the web page in the browser 115 to instruct the applet 103 of the contactless card 101 to generate a cryptogram, e.g., the cryptograms 148 or 201. More generally, the cryptogram may be generated by the applet 103 incrementing the counter 104, encrypting the counter 104 and master key 105 to generate an instance of a diversified key 106, and encrypt the customer ID 107 using the diversified key 106. The applet 103 may then transmit or otherwise provide the cryptogram to the mobile device 110, e.g., via NFC. Once received, the web browser 115 may transmit the cryptogram to the server 120, e.g., via the HTTP protocol. The web page and/or web browser 115 may further indicate, to the server 120, that the cryptogram was read from the contactless card 101 via the card reader 118 of the device 110. The web server 127 or any other component of the server 120 may then instruct the authentication application 123 to decrypt the cryptogram.

As shown in FIG. 3B, the authentication application 123, the web server 127, or any other component of the server 120 may return a decryption result to the mobile device 110 indicating whether the cryptogram was decrypted or not decrypted. The mobile device 110 may determine, based on the decryption result, that the cryptogram was decrypted. As shown, the decryption result indicates that the authentication application 123 decrypted the cryptogram, and the authentication for the call is complete. Doing so allows the call center agent to proceed with assisting the caller. In some embodiments, the call center application 126 of the server 120 exposes account attributes from the account data 124 on a GUI of the call center application 126 of the agent system 140 associated with the session ID and/or the call. If, however, the decryption is not successful and/or the session ID is not validated, the authentication for the call may fail, and access to the account data 124 may be restricted to preserve security.

Figures 4A, 4B:
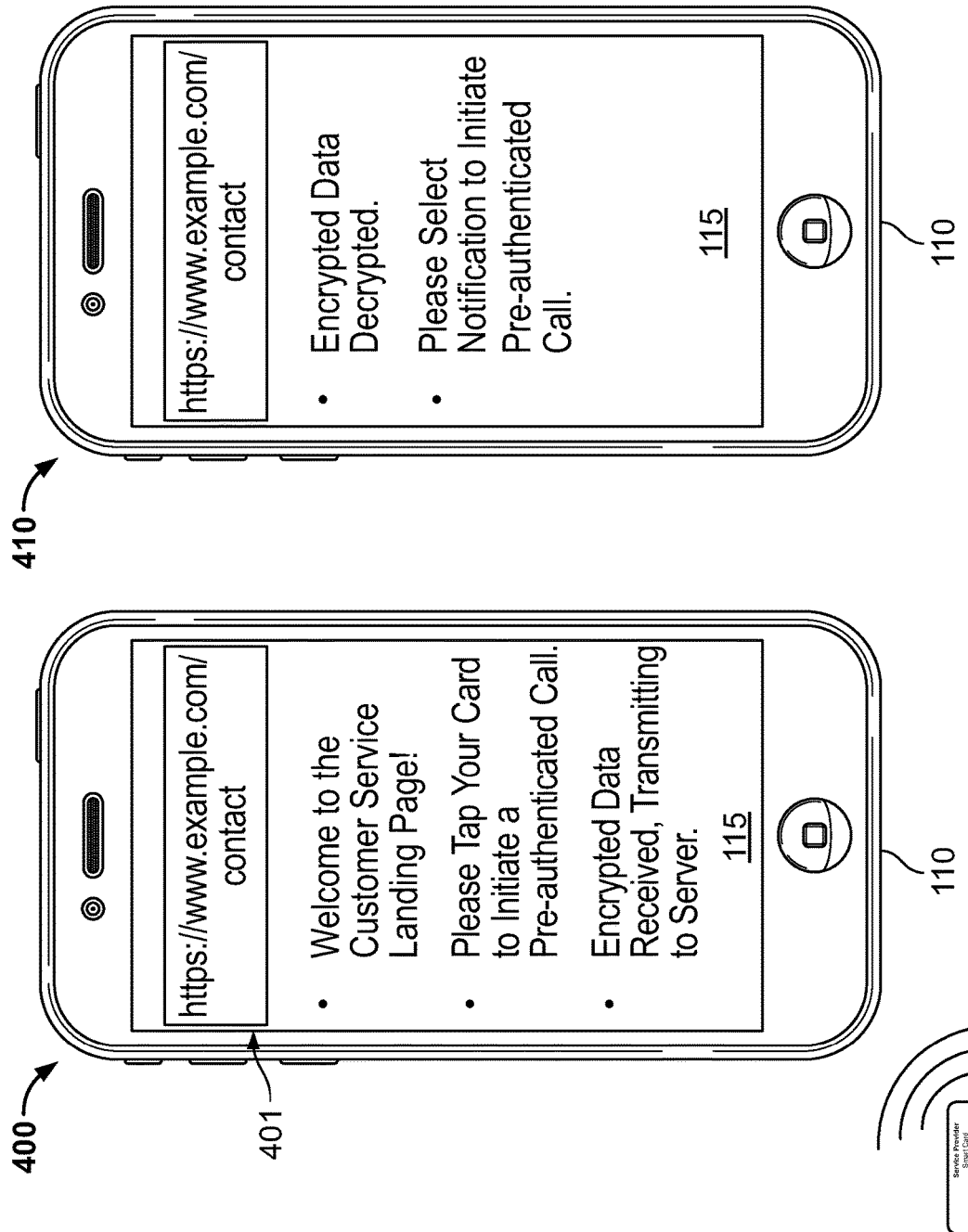
FIGS. 4A-4D illustrate embodiments of a system

FIG. 4A is a schematic 400 illustrating an embodiment of using a contactless card 101 to initiate a pre-authenticated call to the call center application 126 of the server 120. As shown, a mobile device 110 executing a web browser 115 has accessed a web page at a URL 401. The URL 401 may generally be directed to a web page 134 and/or any other resource associated with the server 120. In some embodiments, the URL 401 is directed to one or more web pages associated with the call center application 126 and/or web server 127.

As shown, the web page at the URL 401 instructs the user to tap the contactless card 101 to the mobile device 110. In some embodiments, the instruction to tap the contactless card 101 is based on the web page and/or web server 127 reading one or more cookies of the web browser 115. For example, if the cookies store a known, valid hash value, the web server 127 may permit the pre-authenticated phone call flow to proceed. The user may tap the contactless card 101 to the device 110. Doing so causes the web browser 115 and/or the web page in the browser 115 to instruct the applet 103 of the contactless card 101 to generate a cryptogram, e.g., the cryptograms 148 or 201. More generally, the cryptogram may be generated by the applet 103 incrementing the counter 104, encrypting the counter 104 and master key 105 to generate an instance of a diversified key 106, and encrypt the customer ID 107 using the diversified key 106. The applet 103 may then transmit or otherwise provide the cryptogram to the mobile device 110, e.g., via an NFC read. Once received, the web browser 115 may transmit the cryptogram to the server 120, e.g., via the HTTP protocol. The web page and/or web browser 115 may further indicate, to the server 120, that the cryptogram was read from the contactless card 101 via the card reader 118 of the device 110. The web server 127 or any other component of the server 120 may then instruct the authentication application 123 to decrypt the cryptogram.

In some embodiments, the customer ID 107 is sent with the cryptogram, e.g., to allow the server 120 to identify the proper master key 105 and counter 104. Doing so allows the authentication application 123 to increment the counter 104 of the server 120 associated with the account, generate an instance of the diversified key 106 using the counter 104 and master key 105 associated with the account, and decrypt the cryptogram using the diversified key 106. Similarly, in some embodiments, the cookies are sent with the cryptogram, e.g., to allow the web server 127 to determine whether the cookies include a valid hash value as described above. If a hash value is not present in a cookie, the server 120 may refrain from decrypting the cryptogram and generally refrain from allowing the user to use the pre-authenticated call feature.

FIG. 4B is a schematic 410 illustrating an embodiment where the authentication application 123 has decrypted the cryptogram. As shown, the web page in the web browser 115 reflects that the cryptogram was successfully decrypted, e.g., based on a decryption result received from the server 120. Furthermore, the web page in the web browser 115 instructs the user to select a forthcoming notification to initiate the pre-authenticated call.

Figures 4C, 4D:
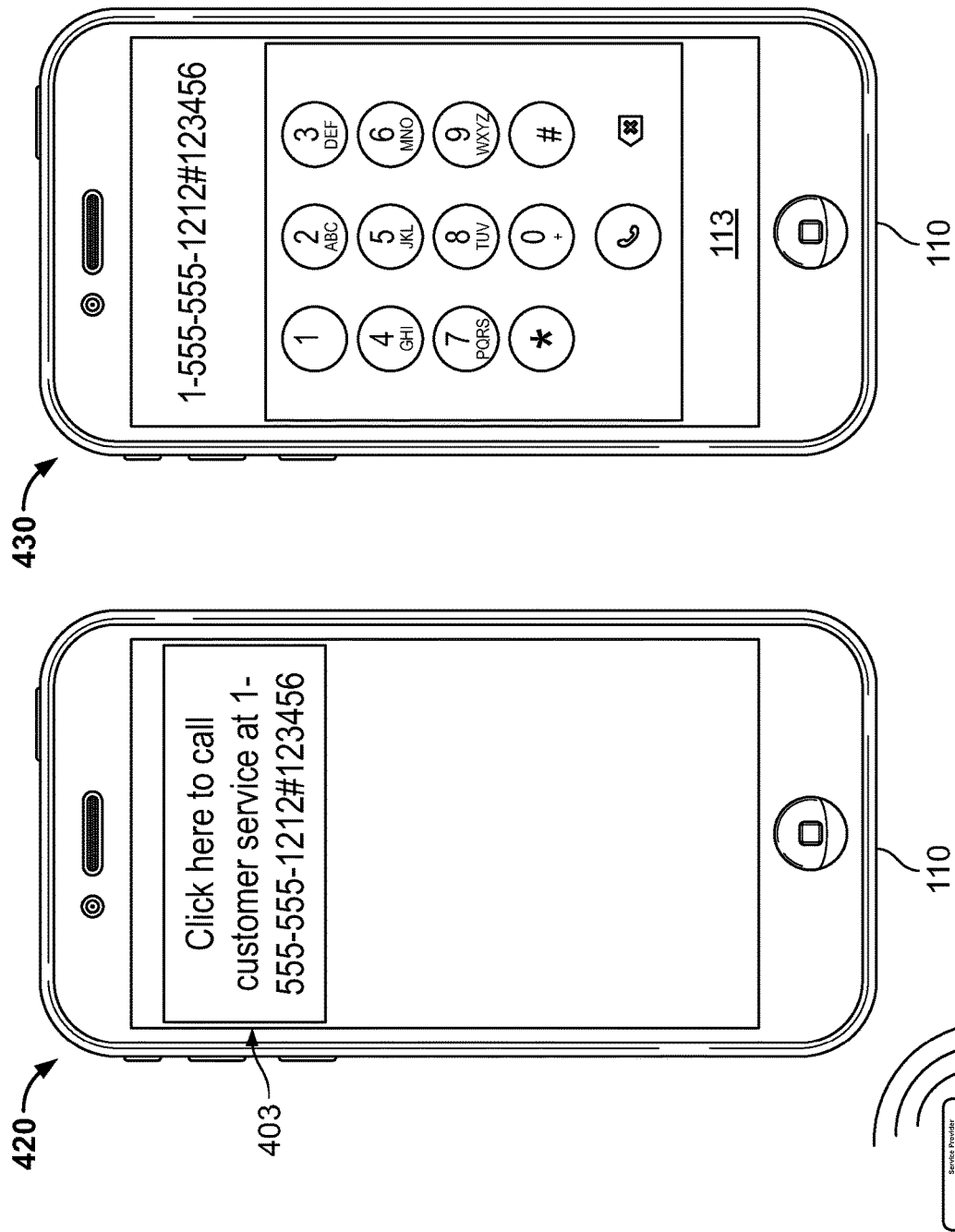

FIG. 4C is a schematic 420 illustrating an embodiment where the mobile device 110 receives a notification 403 including a pre-authenticated phone number. The phone number includes a session ID parameter generated by the call center application 126 of the server 120, e.g., "123456". The notification 403 may be received as an SMS message, email, or any other type of notification. In some embodiments, the web page in the web browser 115 depicted in FIG. 4B may output the notification 403 and/or the relevant information from the notification 403. The pre-authenticated phone number is directed to the call center application 126 of the server 120 and may be associated with the session ID and the associated account (e.g., based on the customer ID 107) in the account data 124. As stated, the session ID may be limited to a predetermined amount of time of validity.

FIG. 4D is a schematic 430 illustrating an embodiment where the user has selected the notification 403. Doing so opens the phone application 113 and causes the phone application 113 to place a call to the number specified in the notification 403. Once answered by the call center application 126 of the server 120, the phone application 113 may provide the session ID parameter as input, e.g., by providing "123456" as input after some predefined time delay.

The call center application 126 of the server 120 may then process the incoming call and associated input. Generally, the call center application 126 determines whether the phone call is directed to a pre-authenticated phone number. If the call is directed to the pre-authenticated phone number, the call center application 126 determines whether the correct session ID is received as input. For example, the call center application 126 of the server 120 may compare the received session ID to the session ID for the pre-authenticated call stored in the account data 124. If the comparison results in a match, the call center application 126 of the server 120 determines whether the phone call is received while the session ID is still valid, e.g., whether the call is received within the time limit assigned to the session ID. For example, if the time limit for the session ID is 5 minutes, and the call is received in 4 minutes, the call center application 126 of the server 120 determines the session ID is valid. The call center application 126 of the server 120 may then directly connect the pre-authenticated call to an agent. Doing so may include allowing the pre-authenticated call to skip other calls waiting in line. Furthermore, doing so may populate the GUI of the call center application 126 with one or more attributes of the account from the account data 124.

Figure 5:
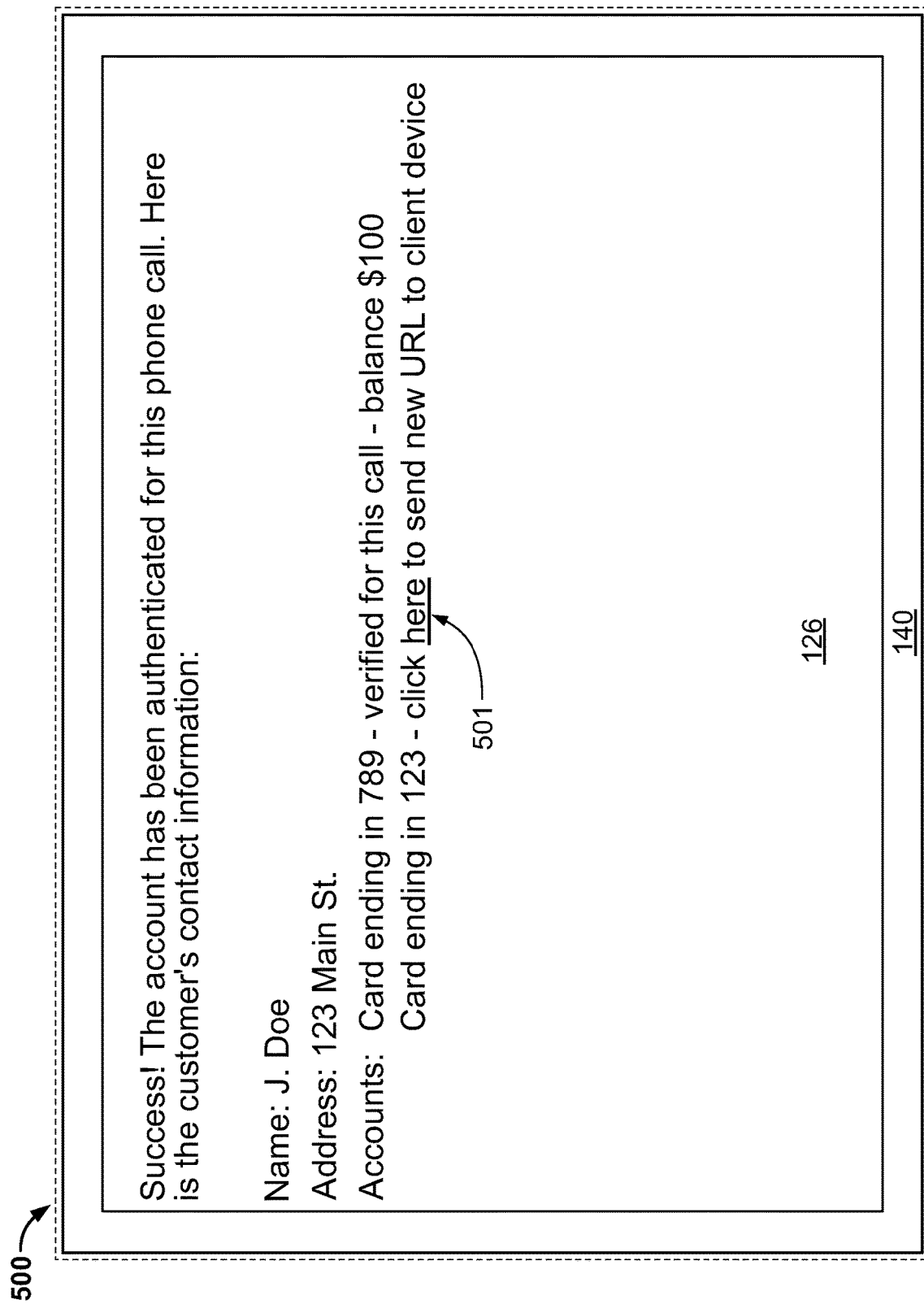
FIG. 5 illustrates an example user interface.

FIG. 5 is a schematic 500 depicting an example agent device 140 executing an instance of the call center application 126. Generally, once a call is authenticated using one or more of the techniques described herein, the GUI of the call center application 126 may output one or more elements of data from the account data 124 for the authenticated account. For example, as shown, the GUI depicts a name, address, and information regarding one or more accounts of the user. The GUI further includes a link 501 that, when selected, causes the call center application 126 of the server 120 to generate a session ID for a call, associate the session ID to the account ending in 123 and the call, and transmit a URL with session ID 108 to the device 110 as described above. Once the URL is accessed in the web browser 115, the user may tap the contactless card 101 to generate a cryptogram, which is sent to the server 120 for decryption. Upon successful decryption of the cryptogram and a comparison of the session ID in the URL 108 and the stored session ID resulting in a match, the call may be authenticated for that account. In such an embodiment, additional details for this account may be exposed. For example, while the balance is displayed for the account ending in 789 (e.g., based on successful authentication for the call using the card ending in 789 using one or more techniques described herein), the balance of the account ending in 123 is not displayed. Therefore, if the call is authenticated using the contactless card 101 ending in 123, the account balance for the account ending in 123 (and/or other details) may be displayed. Advantageously, therefore, security may be enhanced by requiring the different contactless cards 101 to authenticate access to the associated accounts while on the same call with the call center agent.

Figure 6A:
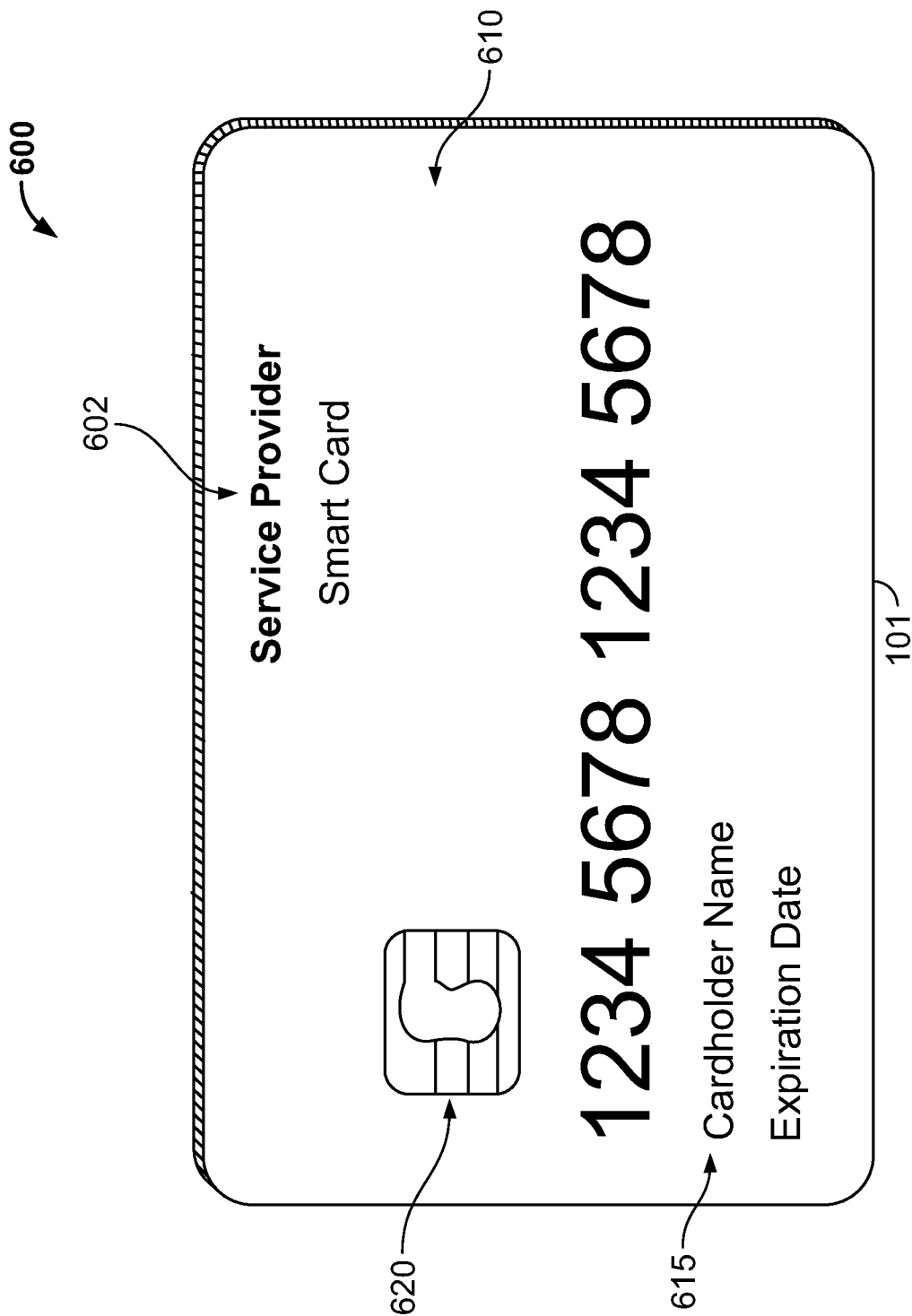
FIGS. 6A-6B illustrate an example contactless card.

FIG. 6A is a schematic 600 illustrating an example configuration of a contactless card 101, which may include a payment card, such as a credit card, debit card, or gift card, issued by a service provider as displayed as service provider indicia 602 on the front or back of the contactless card 101. In some examples, the contactless card 101 is not related to a payment card, and may include, without limitation, an identification card. In some examples, the contactless card may include a dual interface contactless payment card, a rewards card, and so forth. The contactless card 101 may include a substrate 610, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

Figure 6B:
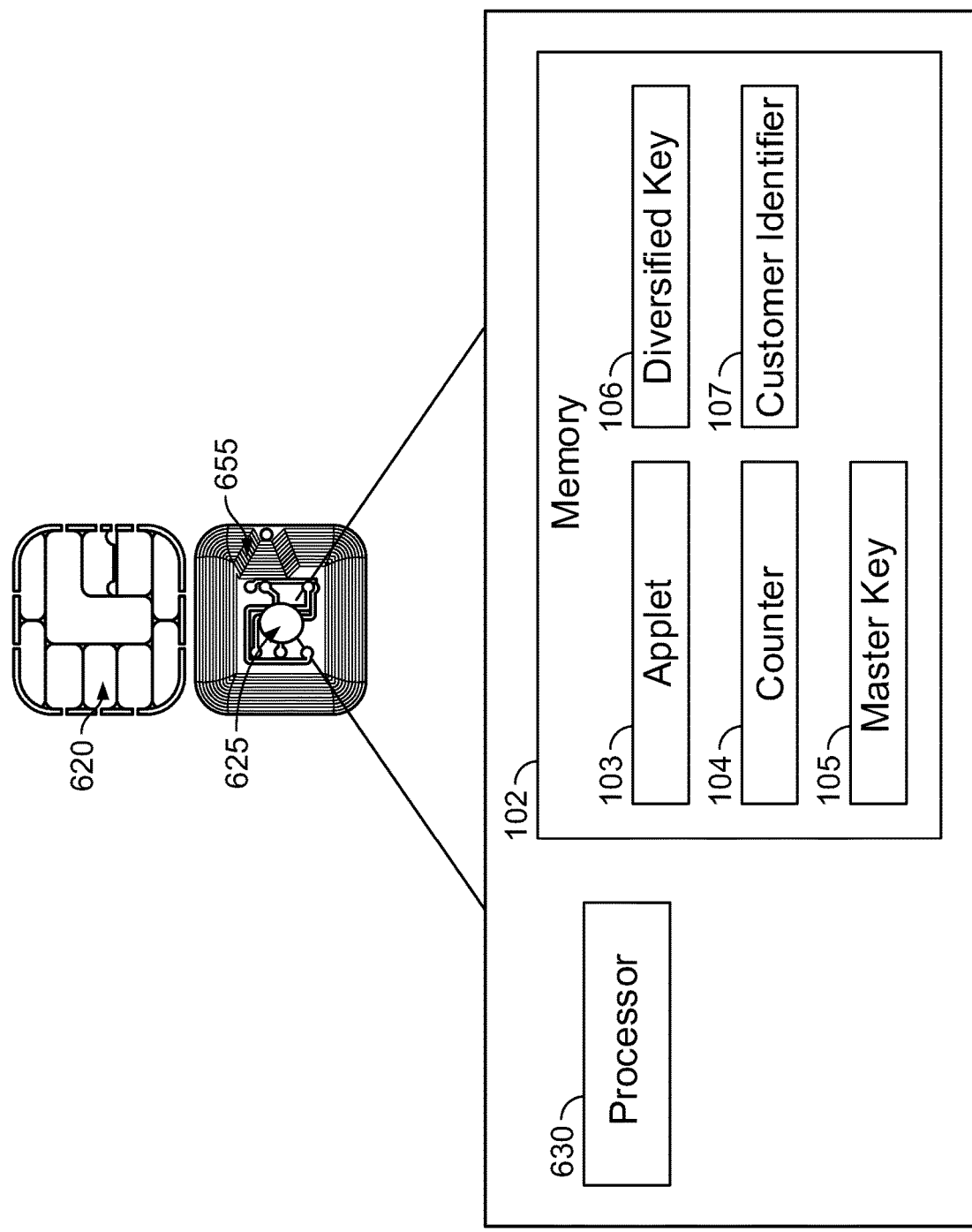

The contactless card 101 may also include identification information 615 displayed on the front and/or back of the card, and a contact pad 620. The contact pad 620 may include one or more pads and be configured to establish contact with another client device, such as an ATM, a user device, smartphone, laptop, desktop, or tablet computer via contactless cards. The contact pad may be designed in accordance with one or more standards, such as ISO/IEC 7816 standard, and enable communication in accordance with the EMV protocol. The contactless card 101 may also include processing circuitry, antenna and other components as will be further discussed in FIG. 6B. These components may be located behind the contact pad 620 or elsewhere on the substrate 610, e.g. within a different layer of the substrate 610, and may electrically and physically coupled with the contact pad 620. The contactless card 101 may also include a magnetic strip or tape, which may be located on the back of the card (not shown in FIG. 6A). The contactless card 101 may also include a Near-Field Communication (NFC) device coupled with an antenna capable of communicating via the NFC protocol. Embodiments are not limited in this manner.

As illustrated, the contact pad 620 of contactless card 101 may include processing circuitry 625 for storing, processing, and communicating information, including a processor 630, a memory 102, and one or more communications interface 109. It is understood that the processing circuitry 625 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 102 may be encrypted memory utilizing an encryption algorithm executed by the processor 630 to encrypt data.

The memory 102 may be configured to store one or more applets 103, one or more counters 104, the master key 105, a diversified key 106, and a customer ID 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The one or more counters 104 may comprise a numeric counter sufficient to store an integer. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card 101 associated with the customer's account.

The processor 630 and memory elements of the foregoing exemplary embodiments are described with reference to the contact pad 620, but the present disclosure is not limited thereto. It is understood that these elements may be implemented outside of the contact pad 620 or entirely separate from it, or as further elements in addition to processor 630 and memory 102 elements located within the contact pad 620.

In some examples, the contactless card 101 may comprise one or more antenna(s) 655. The one or more antenna(s) 655 may be placed within the contactless card 101 and around the processing circuitry 625 of the contact pad 620. For example, the one or more antenna(s) 655 may be integral with the processing circuitry 625 and the one or more antenna(s) 655 may be used with an external booster coil. As another example, the one or more antenna(s) 655 may be external to the contact pad 620 and the processing circuitry 625.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the power connection of the contactless card 101, which may be functionally maintained through one or more capacitors. The contactless card 101 may communicate back by switching a load on the coil or load modulation. Load modulation may be detected in the terminal's coil through interference. More generally, using the antenna(s) 655, processor 630, and/or the memory 102, the contactless card 101 provides a communications interface to communicate via NFC, Bluetooth, and/or Wi-Fi communications.

As explained above, contactless card 101 may be built on a software platform operable on smart cards or other devices having limited memory, such as JavaCard, and one or more or more applications or applets may be securely executed. Applet 103 may be added to contactless cards to provide a one-time password (OTP) for multifactor authentication (MFA) in various mobile application-based use cases. Applet 103 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applets 103 may be configured to encode the OTP as an NDEF type 6 well known type text tag. In some examples, NDEF messages may comprise one or more records, such as a cryptogram 148, 201. The applets 103 may be configured to add one or more static tag records in addition to the OTP record.

In some examples, the one or more applets 103 may be configured to emulate an RFID tag. The RFID tag may include one or more polymorphic tags. In some examples, each time the tag is read, different cryptographic data is presented that may indicate the authenticity of the contactless card 101. Based on the one or more applet 103, an NFC read of the tag may be processed, the data may be transmitted to a server, such as a server of a banking system, and the data may be validated at the server.

In some examples, the contactless card 101 and server 120 may include certain data such that the card may be properly identified. The contactless card 101 may include one or more unique identifiers (not pictured). Each time a read operation takes place, the counter 104 may be configured to increment. In some examples, each time data from the contactless card 101 is read (e.g., by a computing device 110), the counter 104 is transmitted to the server for validation and determines whether the counter 104 are equal (as part of the validation) to a counter of the server.

The one or more counter 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 since there is no communication between applet 103 on the contactless card 101. In some examples, the contactless card

101 may comprise a first applet 103-1, which may be a transaction applet, and a second applet 103-2, which may be an authentication applet for authenticating calls as disclosed herein. Each applet 103-1 and 103-2 may comprise a respective counter 104.

In some examples, the counter 104 may get out of sync. In some examples, to account for accidental reads that initiate transactions, such as reading at an angle, the counter 104 may increment but the application does not process the counter 104. In some examples, when the device 110 is woken up, NFC may be enabled and the device 110 may be configured to read available tags, but no action is taken responsive to the reads.

To keep the counter 104 in sync, an application, such as a background application, may be executed that would be configured to detect when the device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 6.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
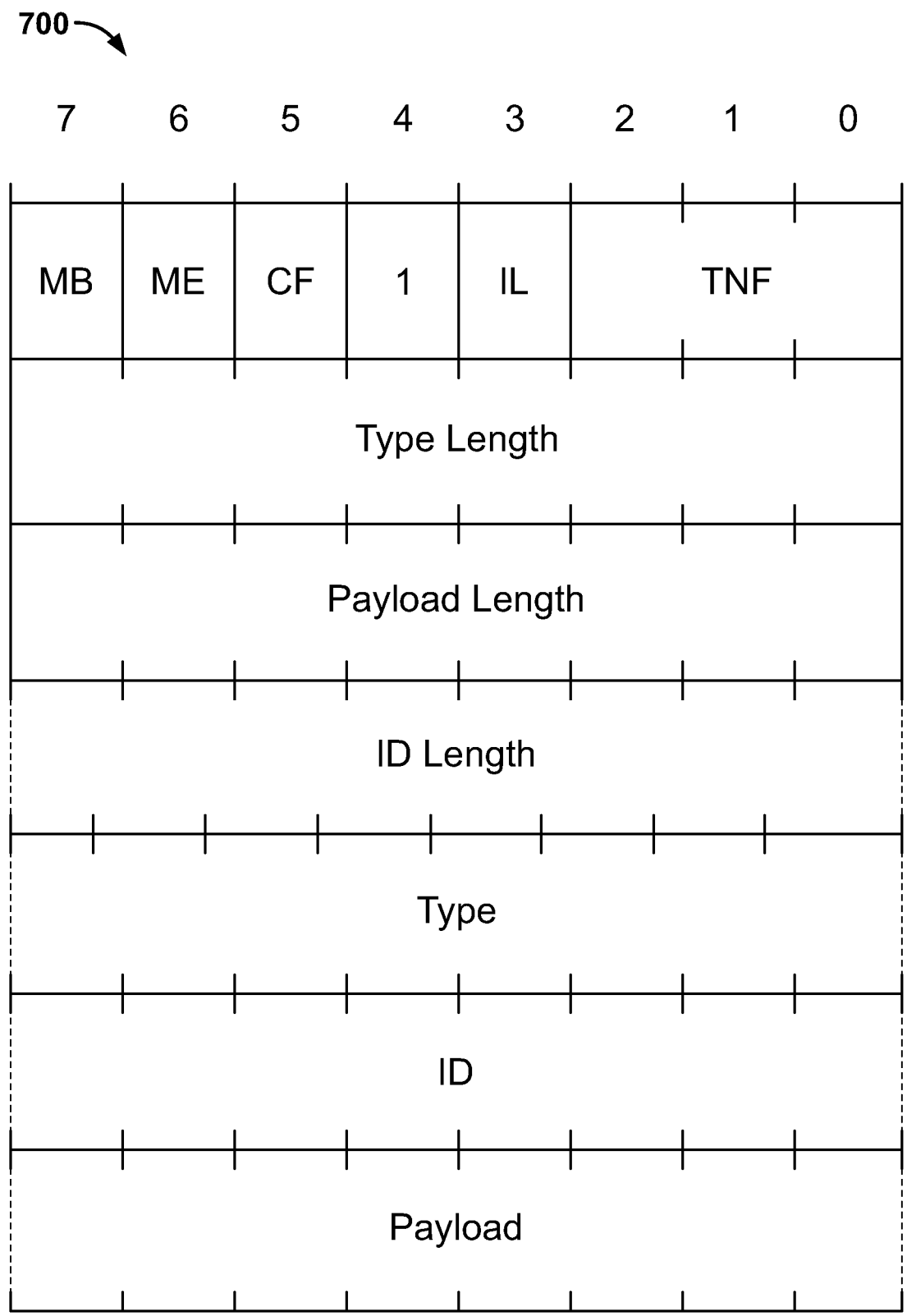
FIG. 7 illustrates a data structure in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850104; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. In various embodiments, the payload of the data structure 700 may store a cryptogram (e.g., an encrypted customer ID 107, the cryptogram 148, and/or the cryptogram 201) and any other relevant data.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some implementations. In addition, the given logic flow may be implemented by a hardware element, a software element executed by a processor, or any combination thereof. The embodiments are not limited in this context.

Figure 8:
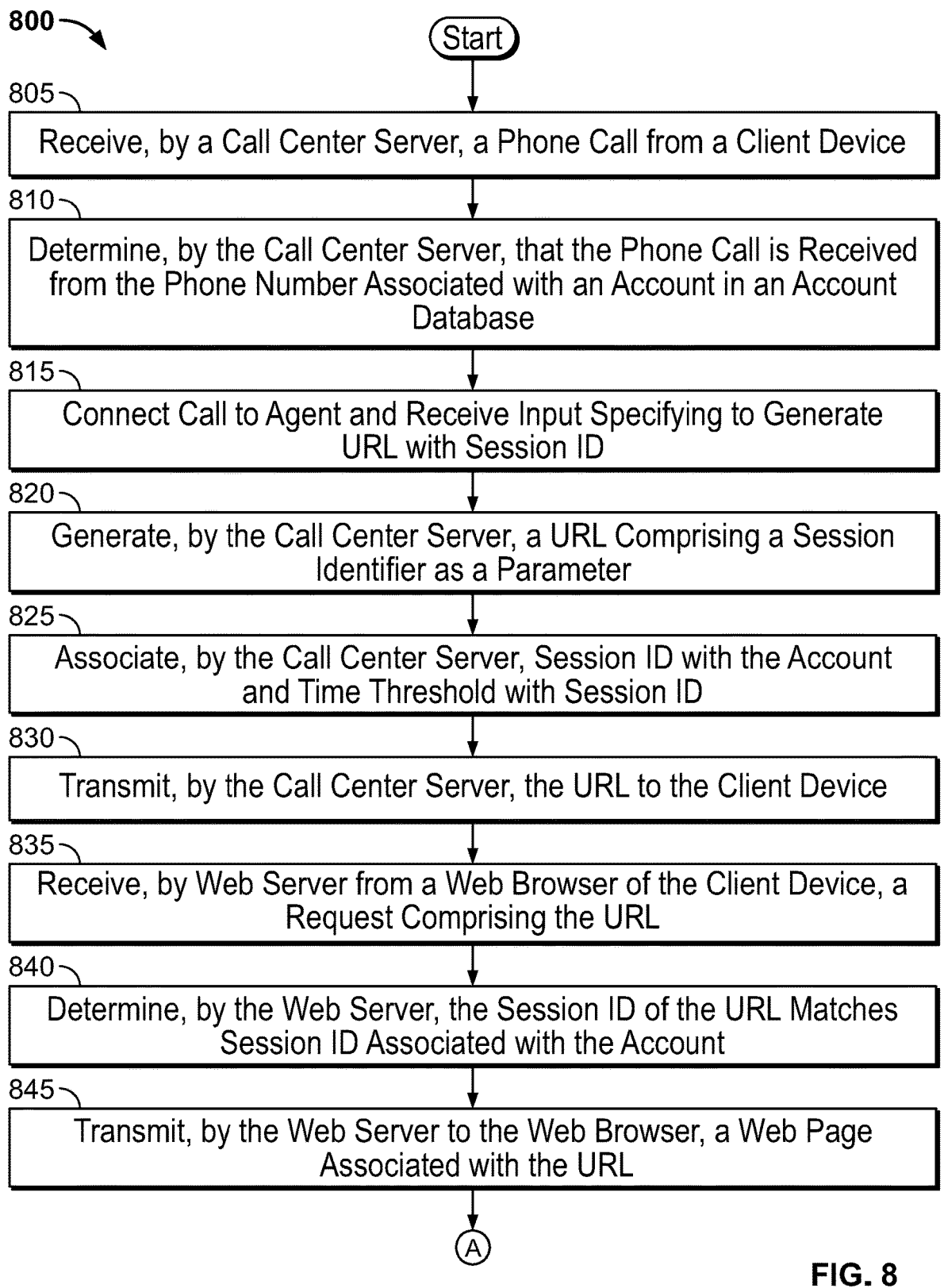
FIG. 8 illustrates a first logic flow.
Figure 8:
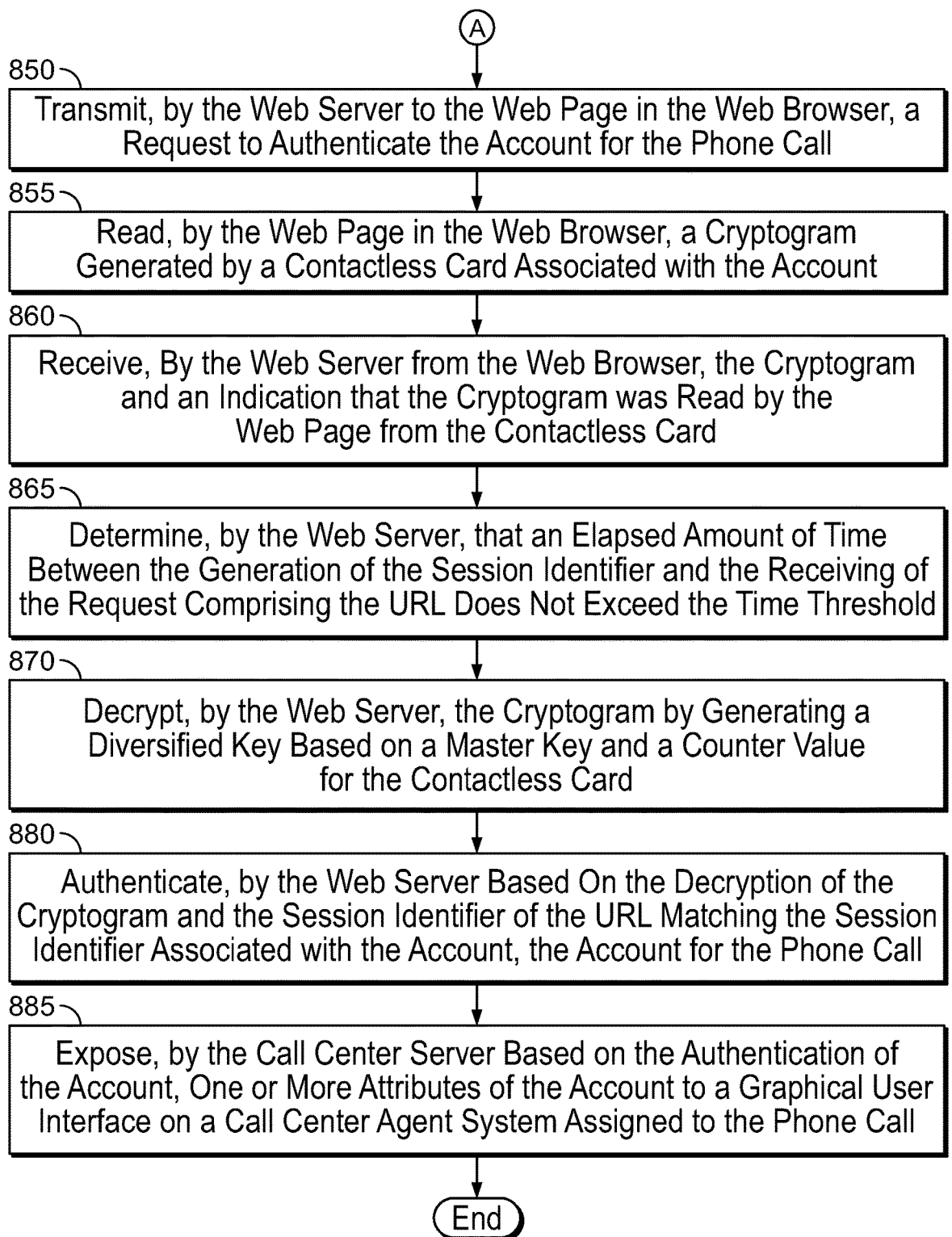

FIG. 8 illustrates an embodiment of a logic flow 800. The logic flow 800 may be representative of some or all of the operations executed by one or more embodiments described herein. For example, the logic flow 800 may include some or all of the operations to use the contactless card 101 to provide secure authentication for calls in a call center system. Embodiments are not limited in this context.

As shown, at block 810, the call center application 126 of the server 120 receives a phone call from a client device. At block 815, the call center application 126 of the server 120 determines that the phone number is associated with one or more accounts in the account database 124. At block 820, the call center application 126 of the server 120 connects the call to an agent. The agent may be associated with an agent system 140 executing an instance of the call center application 126. The agent may specify to generate a URL with session ID at block 820 using the call center application 126. At block 825, the call center application 126 of the server 120 and/or the agent system 140 generates a session ID, e.g., a hash value, and includes the session ID as a parameter in a URL, e.g., the URL 108. At block 830, the call center application 126 associates the session ID with a time limit, the account, the call, and/or the agent in the account data 124.

At block 830, the call center application 126 of the server 120 transmits the URL with session ID 108 to a known contact record associated with the account. For example, the call center application 126 of the server 120 may identify a mobile phone number in the account data 124 for the account and transmit the URL 108 via an SMS message to the phone number. As another example, the call center application 126 of the server 120 may identify an email address associated with the account in the account data 124 and transmit the URL 108 in an email directed to the email address. At block 835, the web server 127 receives an HTTP request from the web browser 115 of a device 110 specifying the URL generated at block 825.

At block 840, the web server 127 and/or the call center application 126 of the server 120 determines that the session ID in the URL received at block 835 matches the session ID stored in the account data at block 830. The call center application 126 of the server 120 and/or the web server 127 may further determine that an amount of time that has elapsed since the generation of the session ID at block 825 and the receipt of the request at block 835 does not exceed the time threshold associated with the session ID. At block 845, the web server 127 transmits a web page 134 associated with the URL 108 to the requesting device 110. The web server 127 may transmit a request to authenticate the call via the web page 134 in the web browser 115 at block 850. Doing so may generally instruct the user to tap the contactless card 101 to the device 110. However, in some embodiments, the request is included in or with the web page transmitted at block 845.

At block 855, the web page 134 and/or web browser 115 reads a cryptogram generated by the contactless card 101. At block 860, the web server 127 receives the cryptogram from the web page 134 and/or web browser 115. The cryptogram may include an indication specifying the cryptogram was read by the web page 134 and/or web browser 115 from the contactless card 101. At block 865, the web server 127 and/or the call center application 126 of the server 120 determines that an amount of time that has elapsed since the generation of the session ID at block 825 and the receipt of the cryptogram at block 860 does not exceed the time threshold associated with the session ID.

At block 870, the authentication application 123 decrypts the cryptogram by based on a diversified key 106 generated based on the master key 105 and counter value 104 for the card 101. At block 880, the web server 127, call center application 126 of the server 120, and/or the authentication application 123 may authenticate the account for the call received at block 805 based on the decryption of the cryptogram, the session ID in the URL 108 matching the stored session ID, and that the session ID has not expired. At block 885, the GUI of the call center application 126 of the agent system 140 may receive one or more attributes of the authenticated account and display the attributes in the GUI based on the authentication at block 880.

Figure 9:
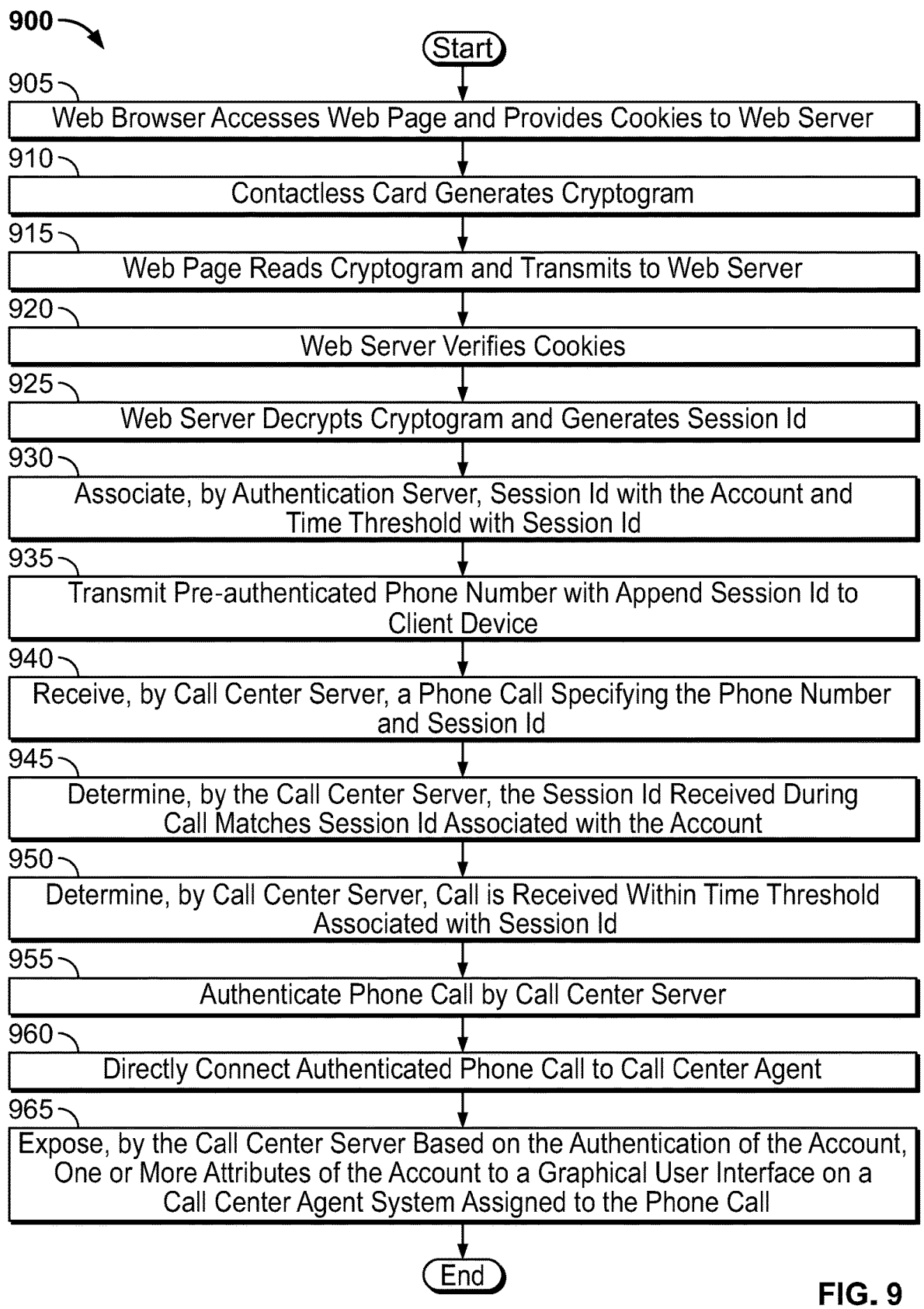
FIG. 9 illustrates a second logic flow.

FIG. 9 illustrates an embodiment of a logic flow 900. The logic flow 900 may be representative of some or all of the operations executed by one or more embodiments described herein. For example, the logic flow 900 may include some or all of the operations to pre-authenticate a call using the contactless card 101. Embodiments are not limited in this context.

In block 905, a web browser 115 of a device 110 accesses a web page 134 hosted by the web server 127. The web browser 115 may include one or more browser cookies 203 in an HTTP request to access the web page 134. Generally, the web page 134 accessed by the web browser 115 instructs the user to tap the contactless card 101 to initiate a pre-authenticated call. At block 910, the user taps the contactless card 101 to the device 110. The web page 134 and/or the web browser 115 may then instruct the contactless card 101 to generate a cryptogram. The contactless card 101 may then generate a data package comprising the cryptogram and an unencrypted customer identifier. At block 915, the web page 134 and/or web browser 115 reads the data package generated by the contactless card 101, e.g., via NFC. The web page 134 and/or web browser 115 may then transmit the data package to the server 120 with an indication specifying that the data package was read from the contactless card 101. As stated, the unencrypted customer identifier may comprise the customer ID 107 of the account or any other unique identifier that allows the server 120 to identify the relevant account, counter value 104, and/or master key 105 in the account data 124.

At block 920, the web server 127 verifies the cookies 203 received from the web browser 115. For example, the web server 127 may determine whether a valid hash value is stored in the cookies 203. At block 925, the web server 127 and/or the authentication application 123 decrypts the cryptogram based on the verification of the cookies 203. Generally, the web server 127 and/or authentication application 123 may identify the master key 105 and current counter value 104 in the account data 124 using the unencrypted customer ID 107 included in the data package with the cryptogram. The web server 127 and/or authentication application 123 may then increment the counter value and encrypt the master key 105 and incremented counter value 104 to generate a diversified key 106. The generated diversified key 106 may be used to attempt to decrypt the cryptogram. If the decryption is successful, the call center application 126 of the server 120, web server 127, and/or authentication application 123 generates a session ID. At block 930, the session ID generated at block 925 is associated with the account in the account data 124 and is assigned a time threshold. At block 935, the web server 127 transmits a pre-authenticated phone number including the session ID to the web browser 115. Doing so causes the web browser 115 to display the phone number. When the user selects the phone number, the phone application 113 may be opened, which initiates a call to the selected number.

At block 940, the call center application 126 of the server 120 receives a phone call specifying the pre-authenticated phone number from the client device 110. The client device 110 may further provide the session ID as input after some predetermined delay. The call center application 126 of the server 120 may generally confirm that the phone call is received on a pre-authenticated phone number. At block 945, the call center application 126 of the server 120 determines that the session ID provided as input during the call matches the session ID stored in the account data 124. At block 950, the call center application 126 of the server 120 determines that the call is received within the time threshold assigned to the session ID. At block 955, the call center application 126 of the server 120 authenticates the call based on the decryption of the cryptogram, the determination that the phone number is received on a pre-authenticated number, that the session ID received as input matches the stored session ID, and that the time threshold assigned to the session ID has not expired. At block 960, the call center application 126 of the server 120 directly connects the call to an agent. At block 965, the GUI of the call center application 126 of an agent system 140 may receive one or more attributes of the authenticated account and display the attributes in the GUI based on the authentication at block 955.

Figure 10:
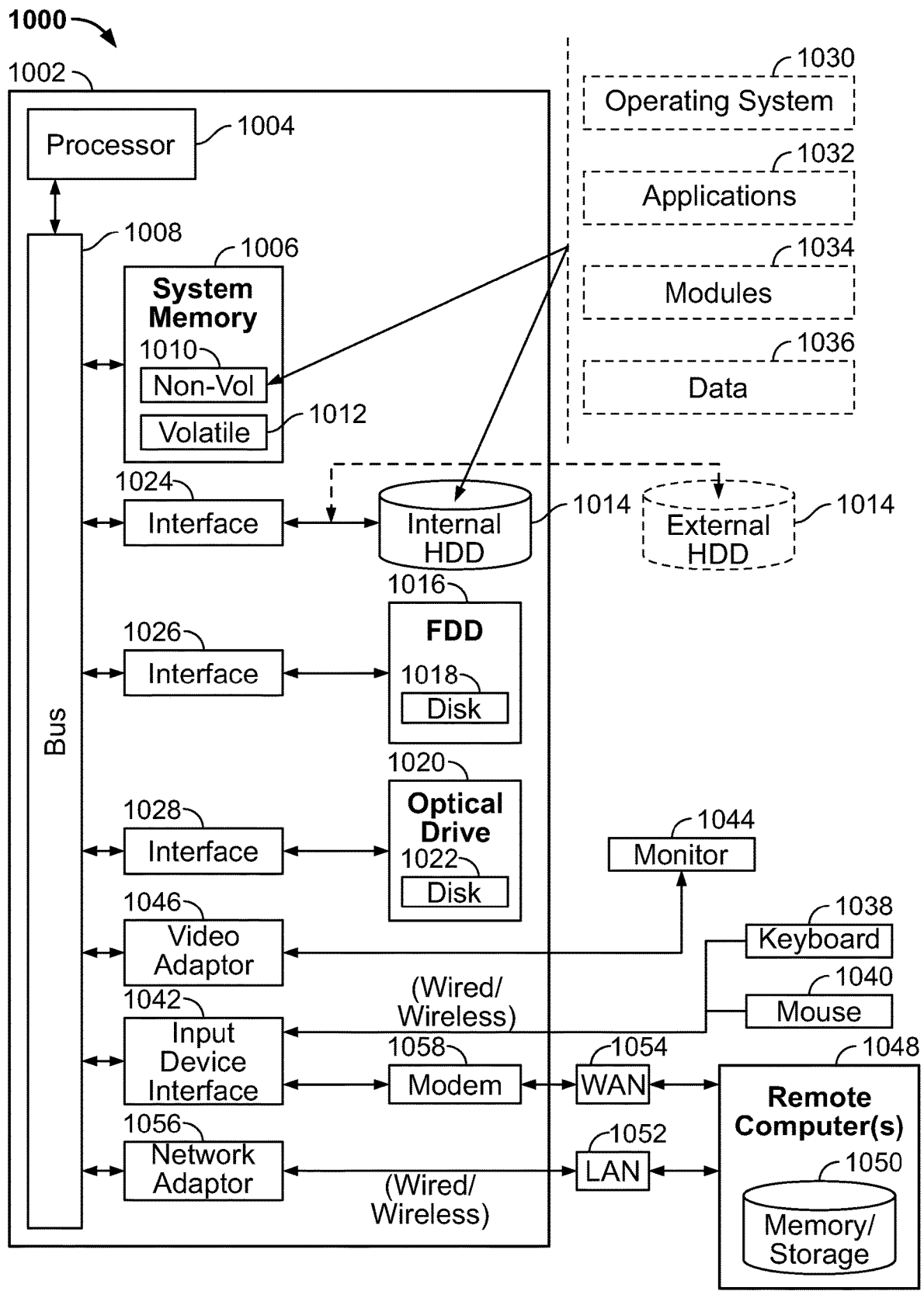
FIG. 10 illustrates a computer architecture in accordance with one embodiment.

FIG. 10 illustrates an embodiment of an exemplary computer architecture 1000 comprising a computing system 1002 that may be suitable for implementing various embodiments as previously described. In one embodiment, the computer architecture 1000 may include or be implemented as part of computing systems 100 or 200. In some embodiments, computing system 1002 may be representative, for example, of the contactless card 101, computing devices 110, server 120, and agent devices 140 of the systems 100-200. The embodiments are not limited in this context. More generally, the computing architecture 1000 is configured to implement all logic, applications, systems, methods, apparatuses, and functionality described herein with reference to FIGS. 1A-9.

As used in this application, the terms "system" and "component" are intended to refer to a computer-related entity, either hardware, a combination of hardware and software, software, or software in execution, examples of which are provided by the exemplary computing computer architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 includes a processor 1012, a system memory 1004 and a system bus 1006. The processor 1012 can be any of various commercially available processors.

The system bus 1006 provides an interface for system components including, but not limited to, the system memory 1004 to the processor 1012. The system bus 1006 can be any of several types of bus structure that may further interconnect to a memory bus (with or without a memory controller), a peripheral bus, and a local bus using any of a variety of commercially available bus architectures. Interface adapters may connect to the system bus 1008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile 1010 and/or volatile 1012 memory. A basic input/output system (BIOS) can be stored in the non-volatile memory 110.

The computer 1002 may include various types of computer-readable storage media in the form of one or more lower speed memory units, including an internal (or external) hard disk drive 1030, a magnetic disk drive 1016 to read from or write to a removable magnetic disk 1020, and an optical disk drive 1028 to read from or write to a removable optical disk 1032 (e.g., a CD-ROM or DVD). The hard disk drive 1030, magnetic disk drive 1016 and optical disk drive 1028 can be connected to system bus 1006 the by an HDD interface 1014, and FDD interface 1018 and an optical disk drive interface 1034, respectively. The HDD interface 1014 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1010, and volatile 1012, including an operating system 1022, one or more applications 1042, other program modules 1024, and program data 1026. In one embodiment, the one or more applications 1042, other program modules 1024, and program data 1026 can include, for example, the various applications and/or components of the systems 100-200, such as the applet 103, counter 104, master key 105, diversified key 106, customer ID 107, phone application 113, web browser 115, URL 108, cryptogram 148, cryptogram 201, cookies 203, authentication application 123, account data 124, call center application 126, web server 127, and web pages 134.

A user can enter commands and information into the computer 1002 through one or more wire/wireless input devices, for example, a keyboard 1050 and a pointing device, such as a mouse 1052. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1012 through an input device interface 1036 that is coupled to the system bus 1006 but can be connected by other interfaces such as a parallel port, IEEE 1394 serial port, a game port, a USB port, an IR interface, and so forth.

A monitor 1044 or other type of display device is also connected to the system bus 1006 via an interface, such as a video adapter 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory and/or storage device 1058 is illustrated. The logical connections depicted include wire/wireless connectivity to a local area network 1056 and/or larger networks, for example, a wide area network 1054. Such LAN and WAN networking environments are commonplace in offices and companies, and facilitate enterprise-wide computer networks, such as intranets, all of which may connect to a global communications network, for example, the Internet.

When used in a local area network 1056 networking environment, the computer 1002 is connected to the local area network 1056 through a wire and/or wireless communication network interface or network adapter 1038. The network adapter 1038 can facilitate wire and/or wireless communications to the local area network 1056, which may also include a wireless access point disposed thereon for communicating with the wireless functionality of the network adapter 1038.

When used in a wide area network 1054 networking environment, the computer 1002 can include a modem 1040, or is connected to a communications server on the wide area network 1054 or has other means for establishing communications over the wide area network 1054, such as by way of the Internet. The modem 1040, which can be internal or external and a wire and/or wireless device, connects to the system bus 1006 via the input device interface 1036. In a networked environment, program modules depicted relative to the computer 1002, or portions thereof, can be stored in the remote memory and/or storage device 1058. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-10 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
receiving, by a server from a web browser on a client device, a hypertext transfer protocol (HTTP) request comprising a cookie;
verifying, by the server, the cookie;
receiving, by the server from the web browser, a cryptogram read by the web browser via a card reader of the client device;
decrypting, by the server based on the verification of the cookie, the cryptogram;
generating, by the server, a session identifier associated with an account;
transmitting, by the server, an authenticated phone number including the session identifier to the web browser;
receiving, by the server, a phone call specifying the authenticated phone number;
receiving, by the server during the phone call, input specifying the session identifier;
determining, by the server, that the session identifier received as input matches the session identifier associated with the account; and
providing, by the server based on the verification of the cookie, the decryption of the cryptogram, and the determination that the session identifier received as input matches the session identifier associated with the account, one or more attributes of the account to a graphical user interface displayed on an agent system assigned to the phone call.

2. The method of claim 1, further comprising:
determining, by the server, that the phone call is received on a pre-authenticated phone number.

3. The method of claim 1, further comprising:
assigning, by the server, a time threshold to the session identifier; and
determining, by the server, that an elapsed amount of time between the generation of the session identifier and the receipt of the phone call does not exceed the time threshold.

4. The method of claim 3, wherein the one or more attributes are provided based on the determination that the elapsed amount of time between the generation of the session identifier and the receipt of the phone call does not exceed the time threshold.

5. The method of claim 1, further comprising:
authenticating the account by the server based on the verification of the cookie, the decryption of the cryptogram, and the determination that the session identifier received as input matches the session identifier associated with the account, wherein the one or more attributes are provided based on the authentication of the account.

6. The method of claim 1, further comprising:
automatically connecting, by the server, the phone call to an agent associated with the agent system based on the verification of the cookie, the decryption of the cryptogram, and the determination that the session identifier received as input matches the session identifier associated with the account.

7. The method of claim 1, wherein the web browser reads the cryptogram from a contactless card associated with the account.

8. A non-transitory computer-readable storage medium, the computer-readable storage medium including instructions that when executed by a computer, cause the computer to:
receive, from a web browser on a client device, a hypertext transfer protocol (HTTP) request comprising a cookie;
verify the cookie;
receive, from the web browser, a cryptogram read by the web browser via a card reader of the client device;
decrypt, based on the verification of the cookie, the cryptogram;
generate a session identifier associated with an account;
transmit an authenticated phone number including the session identifier to the web browser;
receive a phone call specifying the authenticated phone number;
receive, during the phone call, input specifying the session identifier;
determine that the session identifier received as input matches the session identifier associated with the account; and
provide, based on the verification of the cookie, the decryption of the cryptogram, and the determination that the session identifier received as input matches the session identifier associated with the account, one or more attributes of the account to a graphical user interface displayed on an agent system assigned to the phone call.

9. The computer-readable storage medium of claim 8, wherein the instructions further configure the computer to:
determine that the phone call is received on a pre-authenticated phone number.

10. The computer-readable storage medium of claim 8, wherein the instructions further configure the computer to:
assign a time threshold to the session identifier; and
determine that an elapsed amount of time between the generation of the session identifier and the receipt of the phone call does not exceed the time threshold.

11. The computer-readable storage medium of claim 10, wherein the one or more attributes are provided based on the determination that the elapsed amount of time between the generation of the session identifier and the receipt of the phone call does not exceed the time threshold.

12. The computer-readable storage medium of claim 8, wherein the instructions further configure the computer to:
authenticate the account based on the verification of the cookie, the decryption of the cryptogram, and the determination that the session identifier received as input matches the session identifier associated with the account, wherein the one or more attributes are provided based on the authentication of the account.

13. The computer-readable storage medium of claim 8, wherein the instructions further configure the computer to:
automatically connect the phone call to an agent associated with the agent system based on the verification of the cookie, the decryption of the cryptogram, and the determination that the session identifier received as input matches the session identifier associated with the account.

14. The computer-readable storage medium of claim 8, wherein the web browser reads the cryptogram from a contactless card associated with the account.

15. A computing apparatus comprising:
a processor; and
a memory storing instructions that, when executed by the processor, configure the apparatus to:
receive, from a web browser on a client device, a hypertext transfer protocol (HTTP) request comprising a cookie;
verify the cookie;
receive, from the web browser, a cryptogram read by the web browser via a card reader of the client device;
decrypt, based on the verification of the cookie, the cryptogram;
generate a session identifier associated with an account;
transmit an authenticated phone number including the session identifier to the web browser;
receive a phone call specifying the authenticated phone number;
receive, during the phone call, input specifying the session identifier;
determine that the session identifier received as input matches the session identifier associated with the account; and
provide, based on the verification of the cookie, the decryption of the cryptogram, and the determination that the session identifier received as input matches the session identifier associated with the account, one or more attributes of the account to a graphical user interface displayed on an agent system assigned to the phone call.

16. The computing apparatus of claim 15, wherein the instructions further configure the apparatus to:
determine that the phone call is received on a pre-authenticated phone number.

17. The computing apparatus of claim 15, wherein the instructions further configure the apparatus to:
assign a time threshold to the session identifier; and
determine that an elapsed amount of time between the generation of the session identifier and the receipt of the phone call does not exceed the time threshold.

18. The computing apparatus of claim 17, wherein the one or more attributes are provided based on the determination that the elapsed amount of time between the generation of the session identifier and the receipt of the phone call does not exceed the time threshold.

19. The computing apparatus of claim 15, wherein the instructions further configure the apparatus to:
authenticate the account based on the verification of the cookie, the decryption of the cryptogram, and the determination that the session identifier received as input matches the session identifier associated with the account, wherein the one or more attributes are provided based on the authentication of the account.

20. The computing apparatus of claim 15, wherein the instructions further configure the apparatus to:
automatically connect the phone call to an agent associated with the agent system based on the verification of the cookie, the decryption of the cryptogram, and the determination that the session identifier received as input matches the session identifier associated with the account.

* * * * *